(12) United States Patent
Nagasawa et al.

(10) Patent No.: US 6,768,928 B1
(45) Date of Patent: Jul. 27, 2004

(54) MECHANISM COMPONENT DESIGN SUPPORT SYSTEM

(75) Inventors: Isao Nagasawa, Munakata (JP); Masanobu Umeda, Munakata (JP); Tatsuji Higuchi, Akiruno (JP); Yasuyuki Nishidai, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/573,296

(22) Filed: May 18, 2000

(30) Foreign Application Priority Data

May 20, 1999 (JP) .......................................... 11-140215

(51) Int. Cl.[7] .............................................. G06F 19/00
(52) U.S. Cl. ........................... 700/98; 700/31; 700/105
(58) Field of Search ........................ 700/28–31, 95–98, 700/103–105; 703/1; 716/45, 46, 903, 904, 906, 919–923

(56) References Cited

U.S. PATENT DOCUMENTS

| | | | | |
|---|---|---|---|---|
| 5,122,971 A | * | 6/1992 | Kamejima et al. .............. | 703/1 |
| 5,138,698 A | * | 8/1992 | Aldrich et al. .............. | 345/427 |
| 5,175,797 A | * | 12/1992 | Funabashi et al. ............ | 706/16 |
| 5,488,732 A | * | 1/1996 | Ryu et al. ................ | 707/104.1 |
| 5,521,814 A | * | 5/1996 | Teran et al. ................ | 700/266 |
| 5,524,176 A | * | 6/1996 | Narita et al. .................... | 706/2 |
| 5,555,406 A | * | 9/1996 | Nozawa .......................... | 703/1 |
| 5,748,943 A | * | 5/1998 | Kaepp et al. .................. | 703/1 |

(List continued on next page.)

FOREIGN PATENT DOCUMENTS

| | | |
|---|---|---|
| JP | 05-242203 | 9/1993 |
| JP | 06-103345 | 4/1994 |
| JP | 07-160909 | 6/1995 |
| JP | 8-335279 | 12/1996 |
| JP | 10-254939 | 9/1998 |
| JP | 2000003379 A | * 1/2000 |

OTHER PUBLICATIONS

"Model Based Code Generation and Maintenance," IBM Technical Disclosure Bulletin, Aug. 1992, USA, v. 35, n. 3, pp. 13–1.*

Takashi Ojima et al: "Design Support System for Lens Case Units of Cameras—Mainly Focused on Tolerancing of Mechanical Systems", Transactions of Information Processing Society of Japan, Information Processing Society of Japan, Jan. 15, 1997, vol. 38, No. 1, pp. 131–145.

(List continued on next page.)

*Primary Examiner*—Maria N. Von Buhr
(74) *Attorney, Agent, or Firm*—Frishauf, Holtz, Goodman & Chick, P.C.

(57) ABSTRACT

A mechanism component information is solely managed with an assembly structure. A mechanism component design support system supports systematic mechanism component design, which includes: generation of a mechanism draft using a skeleton model in selecting the mechanism draft and a mechanism operation simulation for the mechanism draft; a mechanism operation simulation in a state in which some (or all) 2D shape are determined; and then automatic generation of a 3D shape and a mechanism operation simulation for the 3D shape.

27 Claims, 16 Drawing Sheets

U.S. PATENT DOCUMENTS

| | | | | |
|---|---|---|---|---|
| 5,954,594 | A | | 9/1999 | Uchiyama et al. ........... 473/290 |
| 6,063,128 | A | * | 5/2000 | Bentley et al. ................. 703/6 |
| 6,230,066 | B1 | * | 5/2001 | Sferro et al. ................. 700/104 |
| 6,240,328 | B1 | * | 5/2001 | LaLonde et al. ............... 700/95 |
| 6,260,046 | B1 | * | 7/2001 | Lukaszewski et al. .. 707/103 R |
| 6,327,551 | B1 | * | 12/2001 | Peterson et al. ................ 703/1 |

OTHER PUBLICATIONS

Masanobu Umeda et al: "Knowledge Representation Model for Engineering Information Circulation of Standard Parts", Transactions of Information Processing Society of Japan, Information Processing Socisty of Japan, Oct. 15, 1997, vol. 38, No. 10, pp. 1905–1918.

Tatsuji Higuchi et al: "Sekkeisha No Know–How Wo Data–Base–KA SHI, Sekkei No Hinwitsu Wo Takameru Sekkei Gengo DSP (last volume)", (Design Language DSP (last volume) of Raising the Quality of Design by by Putting the Designer's Expertise Into Data Base Form), Mechanical Design, Japan, Nikkan Kogyou Shimbun–sha, Oct. 1, 1998, vol. 42, No. 13, pp. 109–117.

* cited by examiner

MECHANISM COMPONENT DESIGN SUPPORT SYSTEM

CROSS-REFERENCE TO RELATED APPLICATIONS

This application is based upon and claims the benefit of priority from the prior Japanese Patent Application No. 11-140215, filed May 20, 1999, the entire contents of which are incorporated he rein by reference.

BACKGROUND OF THE INVENTION

The present invention relates to a mechanism component design support system and a storage medium which stores a mechanism component design support program.

In recent years, demands have arisen for quick developments meeting ever changing consumer needs in product development operation. CAD systems for supporting design operations have received a great deal of attention under these circumstances. The CAD systems are mainly classified into a problem-oriented CAD system constructed to solve a certain problem and a general-purpose CAD system.

Problem-oriented CAD systems have often attained certain effects in business fields in which prototype designs are repeated. The problem-oriented CAD systems cannot support the design of industrial problems, particularly, in mechanism design departments because the life cycles of products are short and technical innovations are quick to come. Design knowledge is installed and hidden in a CAD system, so it is very difficult to perform maintenance and management such as knowledge updating and new registration.

The flow of mechanism design for, e.g., a camera will be described below. The use (basic concept) of a product is generally determined in a planning meeting. The design for a casing, mechanism, and software of the product is then started. Required specifications are determined for the respective units of a mechanism. The design aims at finding design solutions satisfying the required specifications.

FIG. 22 shows the design steps of mechanism units. First of all, a mechanism draft is created. That is, the mechanism draft for controlling the operations of all components is built into a skeleton model (the shapes of some components may be determined beforehand). The actual operation of the mechanism draft is confirmed on an illustration, and specifications satisfying the requirements as a mechanism are selected as a design draft at this stage (UGS: Imagination Engineer can be used).

An actual assembly is made up of a plurality of components. A set of components are extracted and combined to examine the shapes of the components and their limited motions. This combination is called a mechanism. Only the motion of the mechanism can be examined as a combination of points and lines, which generate identical limited motions because the materials, thicknesses, and the like of the components constructing the mechanism need not be considered. A model which represents a mechanism using only points and lines is called a skeleton (the OHM-Sha, Ltd., Shigeo Inada & Hitoshi Morita, "University Course, Study of Mechanism").

When the mechanism draft is confirmed using the skeleton model, the 2D shapes of components are then designed. The shape of some component may be determined by its function or by a combination with other components or units. When the outer shape of a given component is determined beforehand, a function as a mechanism for driving its shape is imparted to it using a skeleton model. A drafter or drafting CAD generally defines a 2D shape, and the operation of the defined 2D shape is checked with paperwork or a copy of the 2D shape. At this time, interference with other components is checked on the 2D model. The 2D shape is segmented (conventional drafting CAD can be used).

When the 2D shape of the component is determined, its 3D shape is then designed. Height (thickness) information as the third dimension is assigned to the 2D shape to design a 3D shape (projected drawing is created in drafting CAD). Interference with other components is checked on the 3D model, and the 3D shape is specified in its detail. As described above, each mechanism component is designed in 2.5D. A designer performs almost all these jobs on the drafter or 2D drafting CAD.

A 3D solid model is built using the components designed as described above, as needed. As a solid model creation method, manual manipulation or automatic creation on 3D CAD (Jpn. Pat. Appln. KOKAI Publication No. 8-335279) can be used.

In conventional design, a designer selects a mechanism draft and manipulates several parameters to select a design draft. In this case, a skilled designer can select an optimal solution in accordance with experience and intuition. An inexperienced designer requires many steps to obtain an optimal design draft. Design drafts selected by designers skilled and inexperienced alike are not always optimal. Large differences in design speed and quality occur due to the capabilities of designers.

Design defects such as interference of components, poor assembly properties, and sinkmarks and undercuts formed by a mold for injection molding often take place. This is because a system for systematizing design knowledge is absent, and knowledge once acquired cannot be used again. Many steps are required as a measure against repeated defects. Unsystematized knowledge adversely affects education of inexperienced designers.

The design operation contents have the following known individual tools.

Skeleton design: UGS: Imagination Engineer (trademark)
    2D shape design: general 2D CAD system
    3D shape design: general 2D CAD system general 3D CAD system Since these systems are built as design supports for individual jobs, they cannot support the whole design consistently. Operation not directly related to the design, i.e., data conversion between systems, must be performed. This operation is inefficient to shorten the design period. Designer's knowledge is difficult to input and edit, and the system knowledge is also hidden. It is therefore difficult to use new knowledge and refer to the details of past knowledge.

An example of a component layout/assembly job efficiency improving support system is disclosed in "Jpn. Pat. Appln. KOKAI Publication No. 10-254939: Mechanism Design Support Apparatus and Method" or the like. Although a support for creating a component shape in combination with other components has been established, no support is available to generate a mechanism draft in entirely new design. A person who actually build a 3D component model is a designer himself, and a large number of design steps are required.

Design books and magazines published as design results contain information of working methods, materials, and tolerances in addition to component shapes. However, such information cannot be added to data or used again because the current 2D CAD system processes the information merely as a character string and the 3D CAD system processes only shapes.

Assume that a mechanism component is prepared using a mold. If a thickness is simply added to a 2D structure, the resultant mechanism component may not be releasable from the mold. To prevent this, a draft angle may be imparted to the mold. It is, however, very cumbersome to perform a new design for defining the draft angle in the mold.

BRIEF SUMMARY OF THE INVENTION

The present invention has been made in consideration of the above situation, and has as its object to provide a mechanism component design support system capable of optimal designing within a short period of time regardless of the skills of designers and allowing reuse of knowledge.

It is another object of the present invention to provide a storage medium which stores a mechanism component design support program for implementing the above mechanism component design support system in a computer.

A design support system of the present invention comprises: a mechanism object library for storing knowledge for defining, on the basis of assembly structure information, a plurality of mechanism components usable in a skeleton model; an examination unit for inputting a mechanism draft for achieving a specified object, using the skeleton model, and examining a function of the skeleton model; a two-dimensional shape editor for generating and optimizing, on the basis of required specifications of the mechanism draft, a two-dimensional shape of a mechanism component selected from said mechanism object library; and a model database for redefining, using the assembly structure, an attribute which is output from said two-dimensional shape editor and defines the mechanism component, and storing the redefined attribute, and wherein the attribute of the mechanism component is solely managed on the basis of the assembly structure information.

According to the present invention, mechanism component information is solely managed with an assembly structure. Systematic mechanism component design can be supported, which includes: generation of a mechanism draft using a skeleton model in selecting the mechanism draft and a mechanism operation simulation for the mechanism draft; a mechanism operation simulation in a state in which some (or all) 2D shape are determined; and then automatic generation of a 3D shape and a mechanism operation simulation for the 3D shape. An optimal design can be performed within a short period of time regardless of the skills of designers, and knowledge can be used again.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will be described with reference to the accompanying drawing.

First Embodiment

Figure 1:
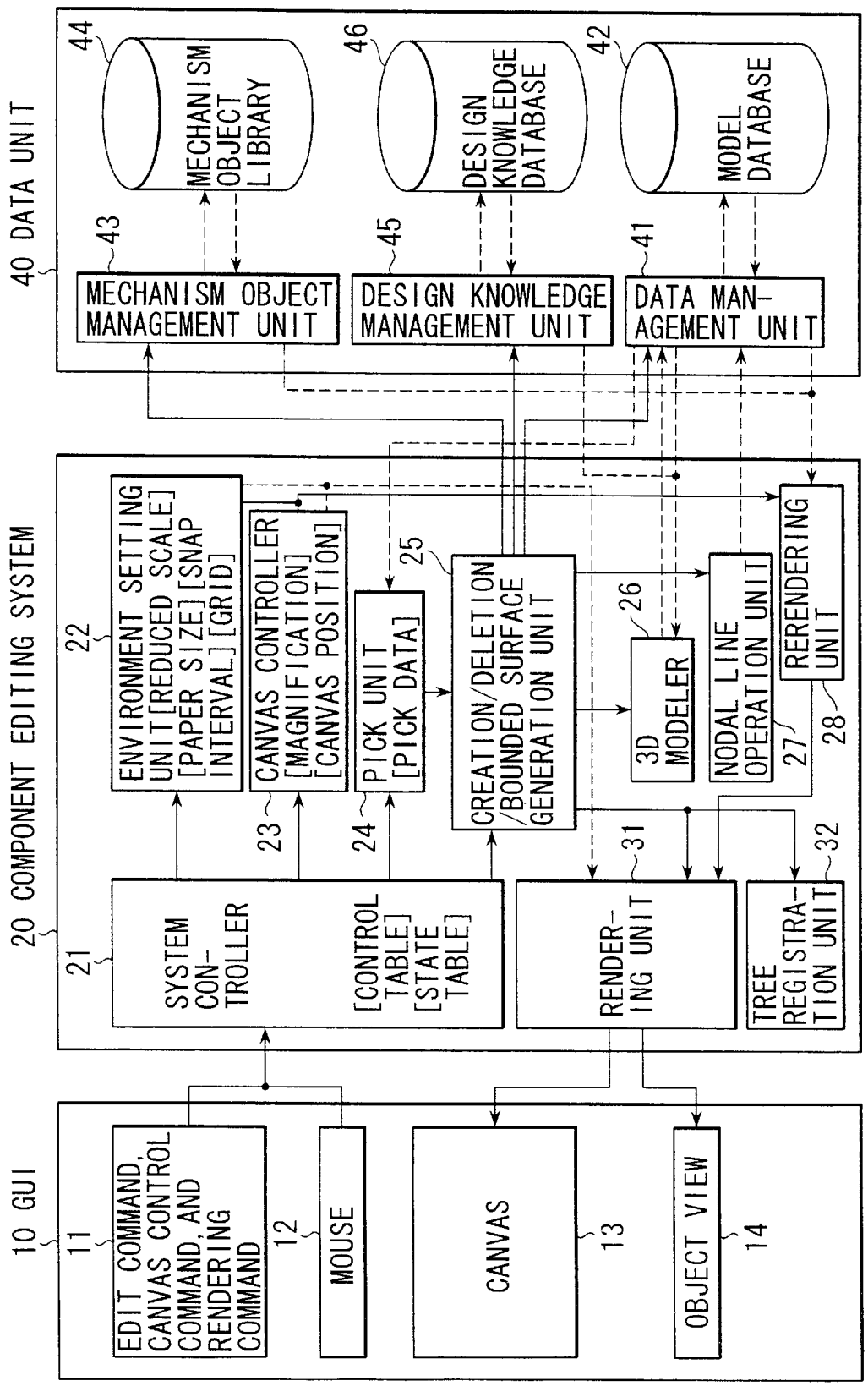
FIG. 1 is a functional block diagram showing the configuration of a mechanism component design support system according to the first embodiment.

FIG. 1 is a functional block diagram showing the configuration of a mechanism component design support system (component detail design editor) according to the first embodiment of the present invention. The solid lines in FIG. 1 indicate the flow of messages and data, while the dotted lines indicate the flow of data. The functions of this embodiment can also be implemented by a computer whose operation is controlled by a program stored in and loaded from a storage medium such as a magnetic disk.

The system of this embodiment is mainly divided into three elements, i.e., a graphical user interface (GUI) 10, component editing system 20, and data unit 40. The functional blocks of this system will be described below.

The GUI 10 provides an environment in which a designer as a user can easily operate. The GUI 10 includes command buttons 11 and a mouse 12 for allowing the user to edit components, a canvas 13 for rendering the 2D bounded surface of a component, and an object viewer 14 for displaying bounded surfaces and line segments in an object tree.

A bounded surface is defined as a surface having a finite area in a region closed when a given closed edge is given to a surface having an infinite area.

An object tree is defined as a database which manages the hierarchical relationship between the assembly objects in a tree structure. A canvas is defined as a system for defining a 2D edge shape. The function of the canvas is limited narrower than drawing creation drafting CAD.

The component editing system 20 serves as the main mechanism in the component detail design editor. The component editing system 20 is comprised of a system controller 21, environment setting unit 22, canvas controller 23, pick unit 24, creation/deletion/bounded surface generation unit 25, 3D modeler 26, nodal line operation unit 27, rerendering unit 28, rendering unit 31, tree registration unit 32, and the like.

All call back signals from the command buttons 11 or mouse 12 of the GUI 10 are sent to the system controller 21. The system controller 21 changes state on the basis of a finite state machine defined in its control table and performs an appropriate process.

The environment setting unit 22 sets the reduced scale of a drawing, a paper size, and a display grid in design environment setting and manages the set values. The environment setting unit 22 also sets and manages the snap grid of the mouse 12 on the canvas 13.

The canvas controller 23 manages the magnification and position of the canvas on the display. A place where a bounded surface is rendered is not on actual paper but on a display screen, and the bounded surface cannot be defined on one page unless the canvas is moved. The canvas position is managed to define the bounded surface on one page.

The pick unit 24 serves as a functional block for picking up an object on the canvas 13. The picked object (bounded surface or line segment) data is stored as pick data. This data is transferred to a necessary functional block.

The creation/deletion/bounded surface generation unit 25 serves as a functional block for generating and deleting a line segment, arc, and bounded surface. The generated object is registered in a model database 42 (to be described later) in the form of an assembly structure.

Each component is made up of a plurality of functional elements, and an assembly is made up of components or lower assembly. The assembly components, and functional elements are called assembly objects. Each assembly object has attributes such as a size, shape, and material representing its features. The layout relationship between functional elements forming a component is represented by designating a length or angle. Similarly, the layout relationship between components forming an assembly is represented by designating a connection relationship between functional elements forming a component. An assembly structure represents the hierarchical relationship between the assembly objects and the layout relationship between the assembly objects.

The rendering unit 31 serves as a mechanism for displaying an object on the canvas 13. The rerendering unit 28 serves as a mechanism functioning to rerender the whole object on the canvas 13 when the environment setting unit 22 changes a management value or the canvas controller 23 changes the magnification. The rerendering unit 22 renders an object in the model database 42 with new settings.

The tree registration unit 32 serves as a mechanism for adding or deleting an object generated or deleted by the creation/deletion/bounded surface generation unit 25 to or from the object viewer 14. The 3D modeler 26 serves as a mechanism for automatically generating a 3D solid model using the bounded surface defined by the designer with the canvas 13 and its height attribute. The nodal line operation unit 27 serves as a mechanism for calculating a nodal line between the bounded surfaces defined by the designer with the canvas 13.

The data unit 40 includes a data management unit 41, the model database 42, a mechanism object library 44, a design knowledge management unit 45, and a design knowledge database 46. A library here means a set of programs for performing general routines. A mechanism object library is a collection of knowledge related to the general mechanism.

The data management unit 41 serves as a,mechanism for managing input/output of information to/from the model database 42. Design information of edited components is managed in the model database 42 in the form of an assembly structure. An actual data structure managed in the model database 42 is basically made up of class (data class), symbol¥name, label, boundaryBox (boundary box on canvas), display (display/nondisplay), and other parameters unique to classes. Data of Face1 is made up of four constituent elements, i.e., polyline1, polyline3, arc4, and arc5. Each bounded surface constituent element has an attribute and a unique parameter such as coordinates. Attribute information necessary for design can be assigned to each element.

Figure 2:
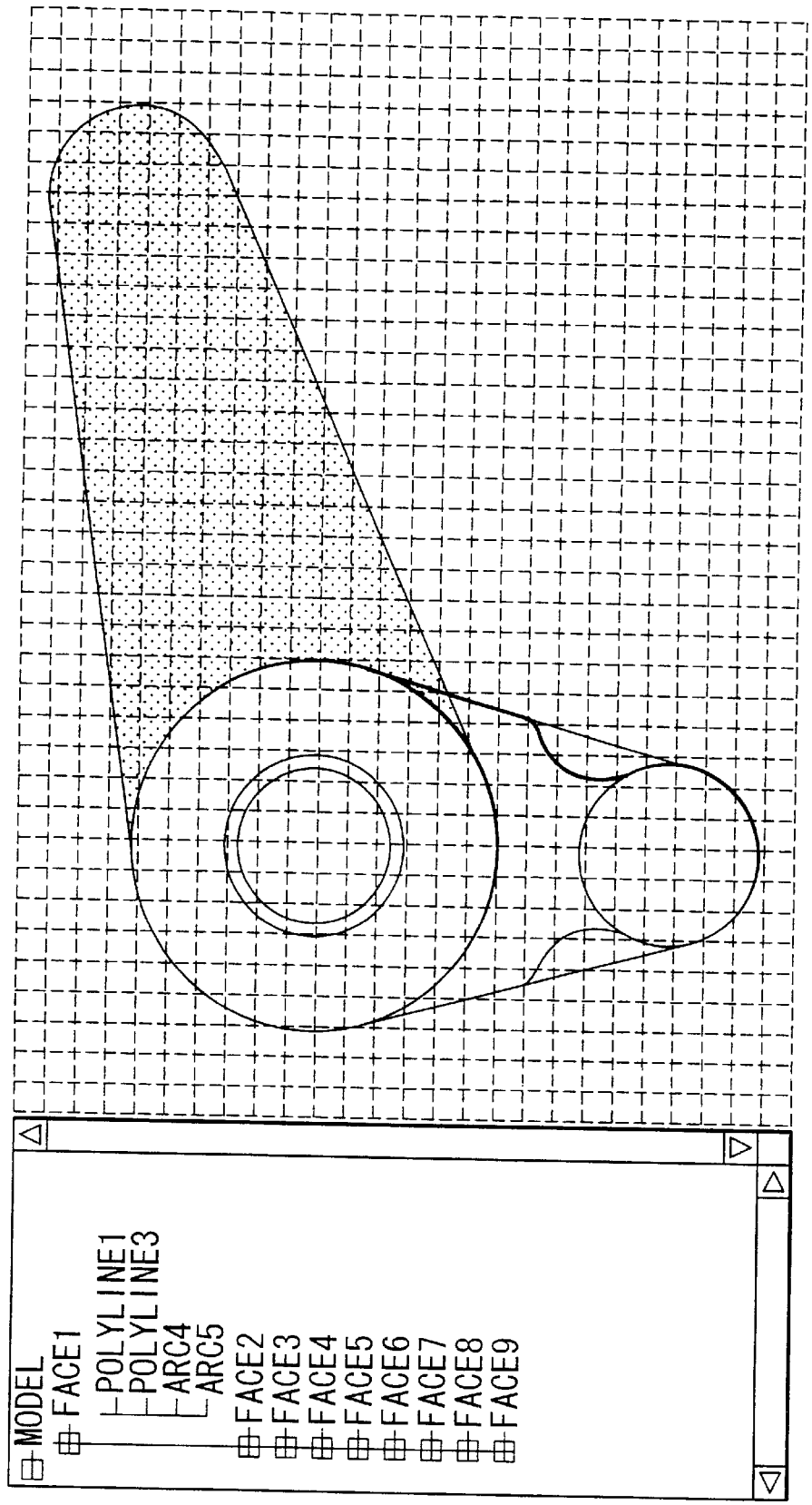
FIG. 2 is a view showing an object view and a lever displayed on a canvas.

Data of constituent elements of face1 (hatched portion) in a lever shown in FIG. 2 are summarized in Table 1 below.

TABLE 1

| BOUNDED SURFACE | CLASS | FACE | |
|---|---|---|---|
| | | SYMBOL NAME | FACE1 |
| | | LABEL | FACE1 |
| | | BOUNDARY BOX | [−8.0,17.0,0,−9.6,5.0] |
| | | DISPLAY | ON |
| | | LINES | [POLYLINE1,POLYLINE2, ARC3,ARC4] |
| LINE SEGMENT | CLASS | POLYLINE | |
| | | SYMBOL NAME | POLYLINE1 |
| | | LABEL | POLYLINE1 |
| | | BOUNDARY BOX | [−8.0,13.3,1,9,4.9] |
| | | DISPLAY | ON |
| | | POLYLINE POINT | [[13.3,4.9], [−8.0,1.9]] |
| | CLASS | POLYLINE | |
| | | SYMBOL NAME | POLYLINE2 |
| | | LABEL | POLYLINE2 |
| | | BOUNDARY BOX | [−4.8,15.3,0,−9.6,−0.7] |
| | | DISPLAY | ON |
| | | POLYLINE POINT | [[15.3,−0.7],[−4.8, −9.6]] |
| ARC | CLASS | ARC | |
| | | SYMBOL NAME | ARC3 |
| | | LABEL | ARC3 |
| | | BOUNDARY BOX | [−7.49,−0.92,−9.6,2.0] |
| | | DISPLAY | ON |
| | | ARC CENTER | [−6.9,−4.0] |
| ARC | CLASS | ARC BEGIN POINT | [−4.8,−9.6] |
| | | ARC END POINT | [−7.48545,1.95208] |
| | CLASS | ARC | |
| | | SYMBOL NAME | ARC4 |
| | | LABEL | ARC4 |
| | | BOUNDARY BOX | [−7.49,−0.92,−9.6,2.0] |
| | | DISPLAY | ON |

TABLE 1-continued

| | |
|---|---|
| ARC CENTER | [−6.9,−4.0] |
| ARC BEGIN POINT | [−4.8,−9.6] |
| ARC END POINT | [−7.48545,1.95208] |

A skeleton model constructing a mechanism is registered in the mechanism object library 44. The model registered in this mechanism object library 44 is a parametric model. A change in parameter and posture (direction) of the parametric model allows arbitrary definitions in size and posture. The mechanism object management unit 43 manages the input/output of the mechanism object library 44.

The design knowledge database 46 stores design knowledge of mechanism components. The designer searches for a design draft on the basis of this knowledge. The design knowledge management unit 45 manages the input/output of the design knowledge database 46.

The design knowledge database 46 stores general technical information about machining. The design knowledge database 46 stores, for the materials of individual mechanism components, mechanical strength, dimensional precision (tolerance), design limit value, optical characteristics, temperature/humidity characteristics, moldability and workability, availability, cost, supply maker, and the like. The design knowledge database 46 stores, for the injection molding technique, design index for gate position and draft angle, appropriateness/inappropriateness of parting direction, expectations of parting line, sinkmark, undercut, and bur, and the number of shots per mold. In addition, the design knowledge database 46 stores information about easily assembly and repair for a unit which implements the mechanism. The design knowledge database 46 stores all these pieces of information as design knowledge. The information in the design knowledge database 46 is desirably maintained upon adding or altering the information due to new design cases or product defect information. The design knowledge management unit 45 solely manages input/output of the design knowledge database 46. Information output from the design knowledge database 46 is transferred to the 3D modeler 26 of the component editing system 20 via the design knowledge management unit 45. Various kinds of design information are appropriately provided to the designer. The designer can quickly search for an optimal design draft on the basis of the above design knowledge without depending on experience and intuition.

Figure 11:
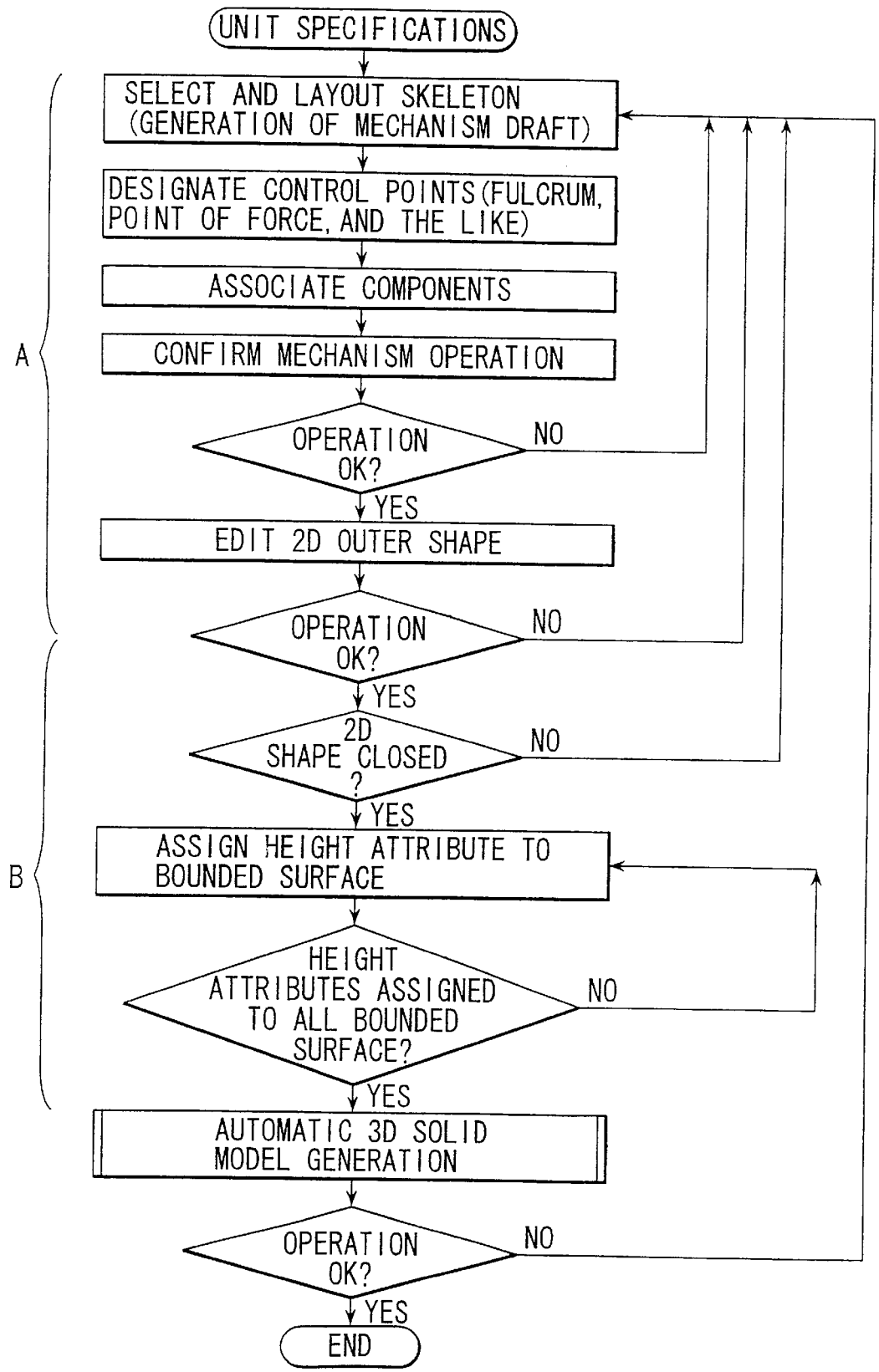
FIG. 11 is a flow chart showing the overall operation when the first embodiment is applied to design of the shutter unit.
Figure 12:
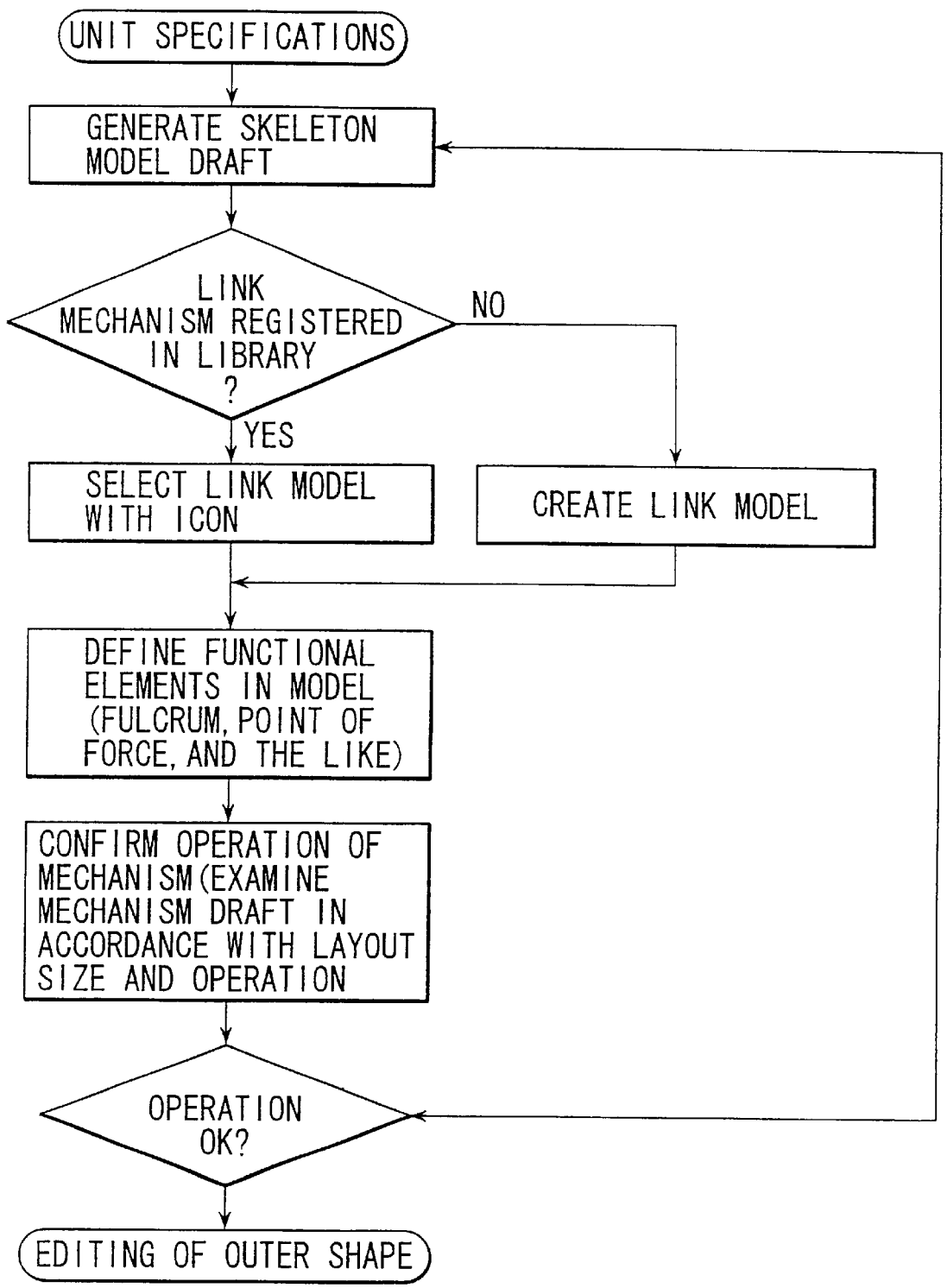
FIG. 12 is a detailed flow chart of part A in FIG. 11.
Figure 13:
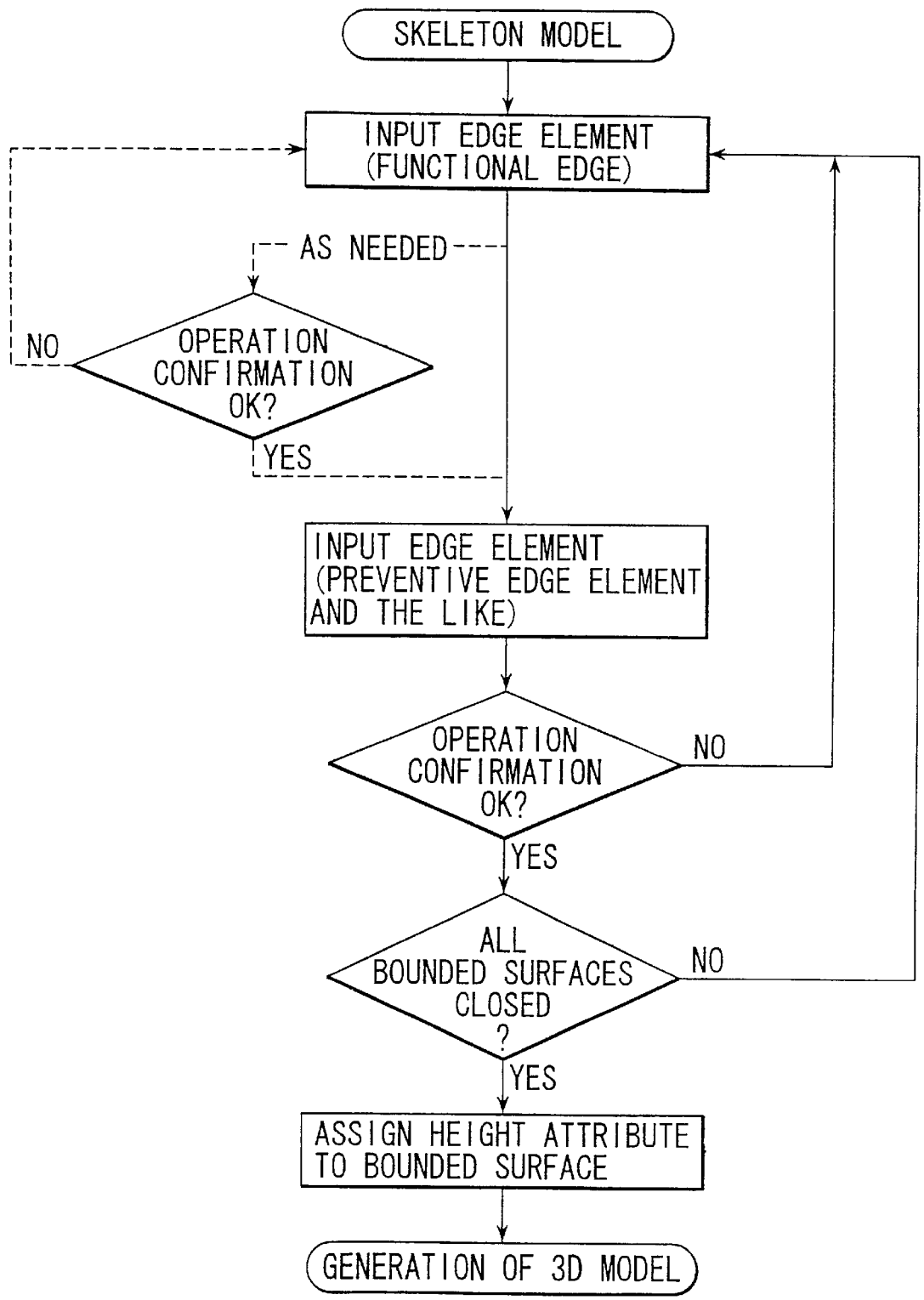
FIG. 13 is a detailed flow chart of part B in FIG. 11.

An application will be described below in which the system of this embodiment is used for designing the one-blade shutter unit of a digital camera. Operation flows are shown in FIGS. 11 to 13. FIG. 11 shows the main operation flow, FIG. 12 shows the detailed flow from selection and layout of a skeleton to operation confirmation (A in FIG. 11), and FIG. 13 shows the detailed flow from editing of 2D outer shapes to assignment of a height attribute to a bounded surface (B in FIG. 13).

According to the specifications of the shutter unit, the shutter blade is driven using a plunger to shield light rays from a lens. The size of the whole camera or lens unit limits the size of the whole shutter unit.

Figure 3:
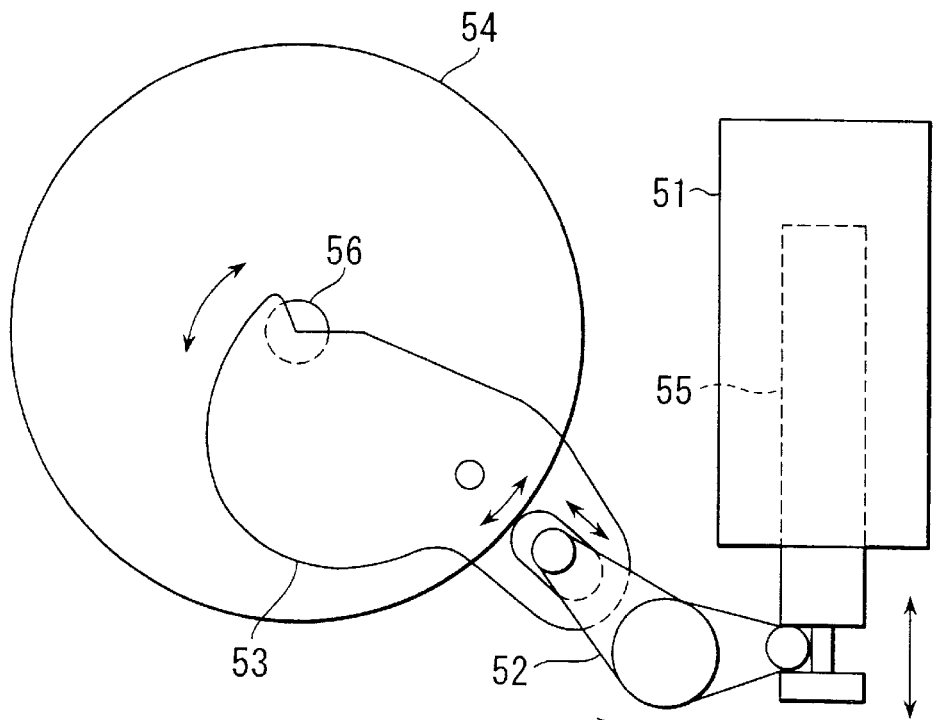
FIG. 3 is a view showing an example of a shutter unit.
Figure 4:
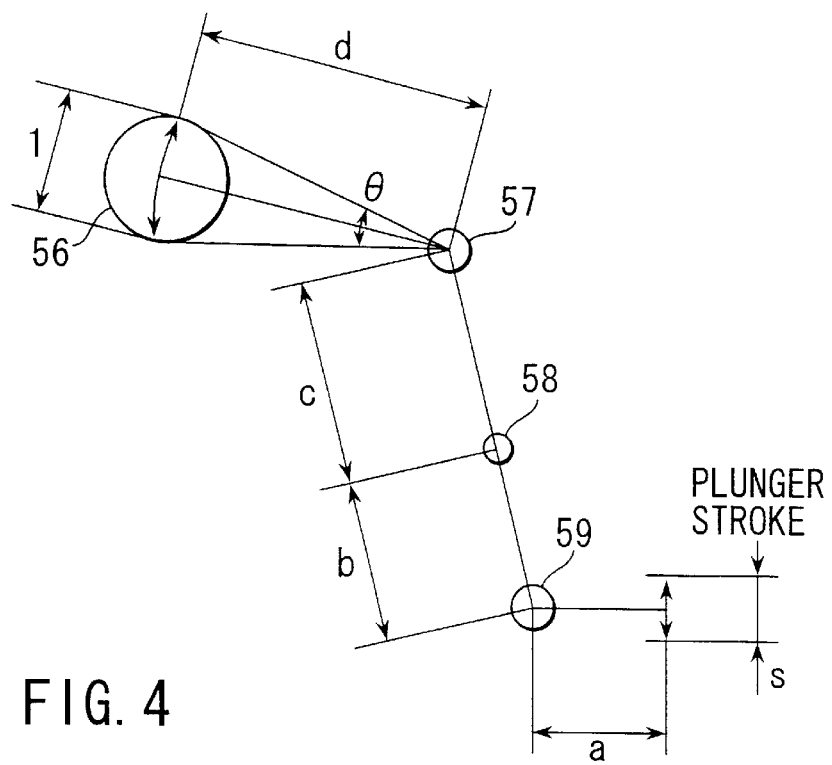
FIG. 4 is a view showing a skeleton model representing the example of the shutter unit.

An example of a shutter unit and a skeleton model illustrating the shutter unit are shown in FIGS. 3 and 4. The shutter unit is made up of a plunger 51, lever 52, and blade 53. These components have the functional elements summarized in Table 2 below.

TABLE 2

| COMPONENT | FUNCTIONAL ELEMENT |
|---|---|
| PLUNGER | COIL AND IRON CORE |
| LEVER | SHAFT AND PIN(2) |
| BLADE | AXIAL HOLE, ELONGATED HOLE, AND OUTER SHAPE |

The connection relationship between the components are summarized in Table 3 below.

TABLE 3

| FUNCTIONAL ELEMENT 1 | FUNCTIONAL ELEMENT 2 | CONNECTION RELATIONSHIP | EXPLANATION |
|---|---|---|---|
| PIN | ELONGATED HOLE | IN LONG HOLE | PRESENCE OF PIN IN ELONGATED HOLE |
| PIN | IRON CORE | TOUCH | CONTACT |
| COIL | (CASE) | FIXED | FIXED |
| SHAFT | (CASE) | SHAFT HOLE PAIR | ENGAGEMENT BETWEEN SHAFT AND HOLE |
| AXIAL HOLE | (CASE) | SHAFT HOLE PAIR | |

Referring to FIGS. 3 and 4, reference numeral 54 denotes a lens frame; 55, an iron core; 56, shutter frame; 57, the center of rotation of the blade; 58, a blade-side lever pin position; and 59, the center of rotation of the lever.

A functional element represents a bounded surface exhibiting a function as a design job unit. A set of functional elements defines a component. The types of functional elements are a plane, cylindrical surface, conical surface, spherical surface, normal surface, mechanical functional surface, and the like. The normal surface is formed by a combination of bounded surfaces and is defined as a side surface parallel to the reference line of a solid obtained by parallel tracing. A column defined from the top surface is defined as a circle. This circle is traced parallel to form a column. The side surface (cylindrical surface) formed by this tracing is the normal surface. A mechanical functional surface is a functional surface such as a gear surface, cam surface or the like of a mechanical component.

Figure 5:
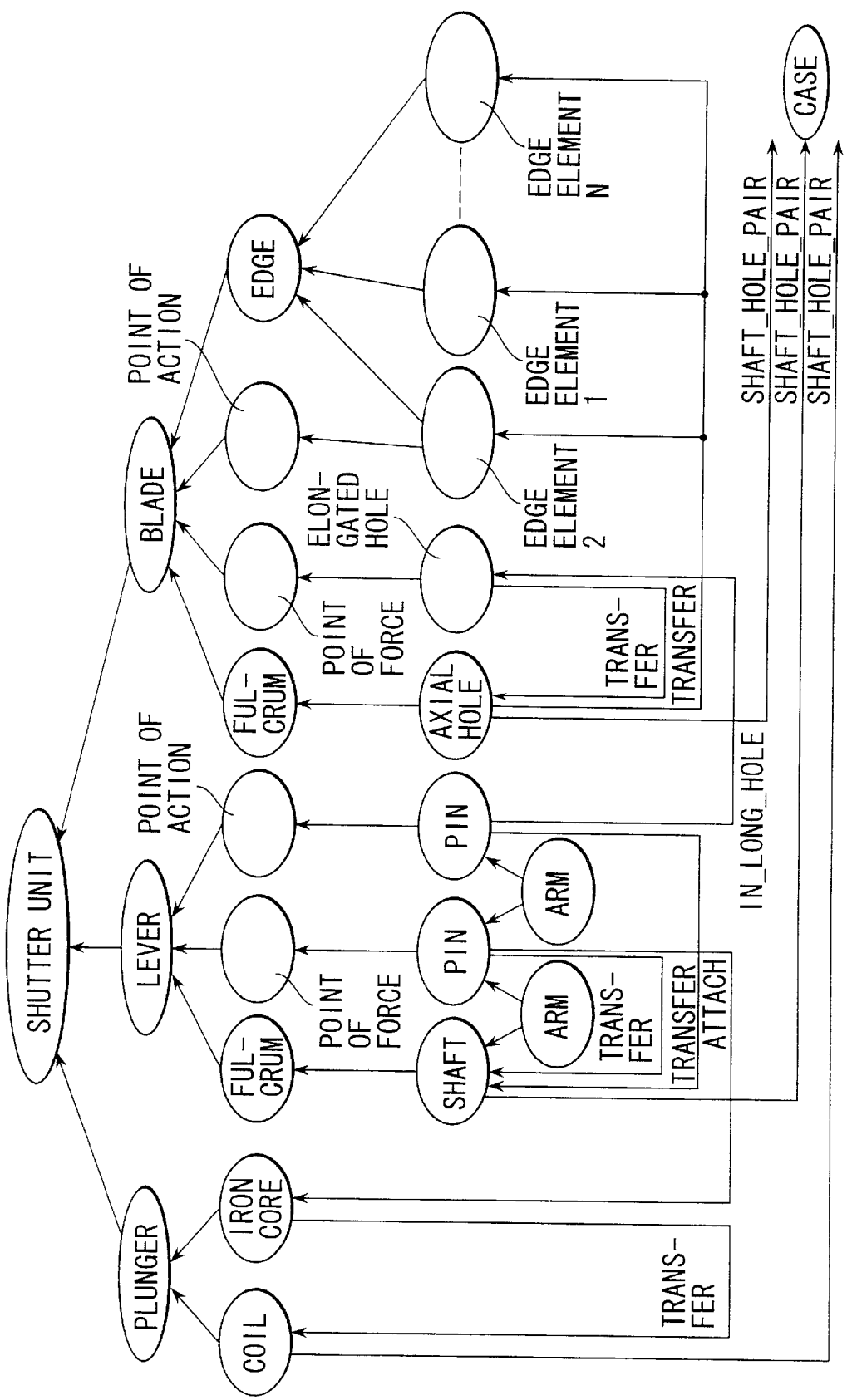
FIG. 5 is a view showing the assembly structure of the shutter unit.

The assembly structure of the shutter unit is shown in FIG. 5. When the shutter unit is considered as a mechanism, a mechanism skeleton model shown in FIG. 5 is generated. At this time, the shutter unit is represented using the skeleton model and represents a component for understanding the mechanism. An elongated hole or the like can be easily represented. Only portions (e.g., a fulcrum, point of force, and point of action) necessary for operating the shutter unit as a mechanism are illustrated.

The parameters of the skeleton model are changed and operated to optimize the design solution of the mechanism. The changes in parameters include changes in layout coordinates. It is possible to optimize the design solution so as to include the layout in accordance with changes in layout coordinates and dimensions. As for dimensions, distances Da, Db, Dc, and Dd of the respective components are calculated in accordance with the changes in layout coordinates, and the stroke ratio is calculated using these distances.

During generation of design solution candidates upon changes in layout and dimensions, the interference between the components and the layout are examined. The mechanism is operated to check if a necessary stroke is assured for the blade.

Restriction conditions must be generally input to perform an operation simulation, and its operation must also be analyzed. The target is the mechanism object located in the support environment, and its operation is obvious from the unit structure. The structure and operation method of the unit are described in an object library, and no analysis is required. Design drafts are repeatedly obtained and examined to narrow them down to fewer design drafts.

A 2D shape is assigned to the skeleton model. The shape can be assigned by adding an edge element to the assembly structure of the component. Since the definition of the 2D shape is mainly based on injection molding using a mold, the 2D shape is defined in the opening direction view in consideration of the parting properties.

Figure 6:
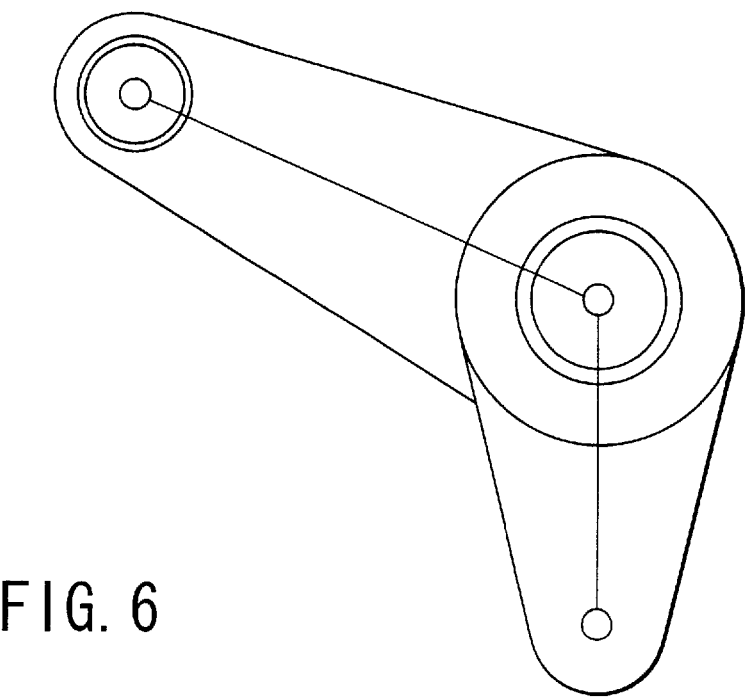
FIG. 6 is a view showing an example of 2D shape definitions of the shutter lever in the shutter unit.
Figure 7:
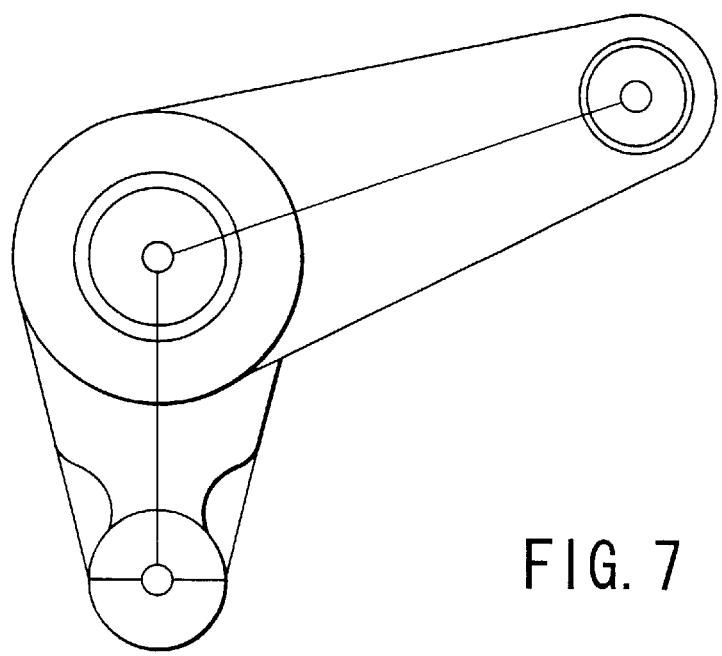
FIG. 7 is a view showing an example of 2D shape definitions of the shutter lever in the shutter unit.

Examples of 2D shape definitions of the shutter lever of the shutter unit are shown in FIGS. 6 and 7. FIG. 6 shows a shape on the stationary side, while FIG. 7 shows a shape on the movable side. In this manner, the mechanism is operated while defining the 2D shapes, and more minute interference check than in the skeleton model can be performed. An edge element is edited, as needed, and each edited edge element is examined. In this case as well, shapes are repeatedly generated and examined to narrow down the design drafts to still fewer design drafts.

Figure 8:
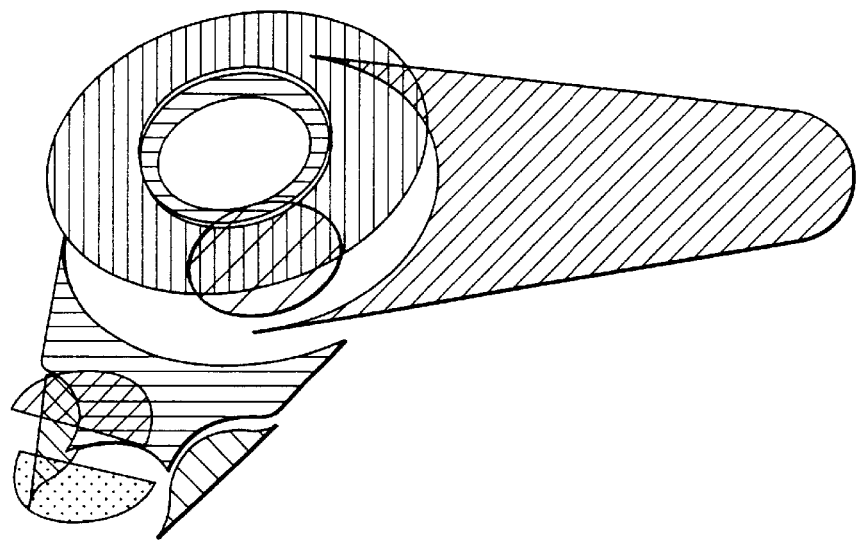
FIG. 8 is a view showing an example of translating each plane of the shutter lever.

A height attribute is assigned to each bounded surface while the 2D shape is closed. Each bounded surface is translated in accordance with the height attribute. The translation results are shown in FIG. 8.

Figure 9:
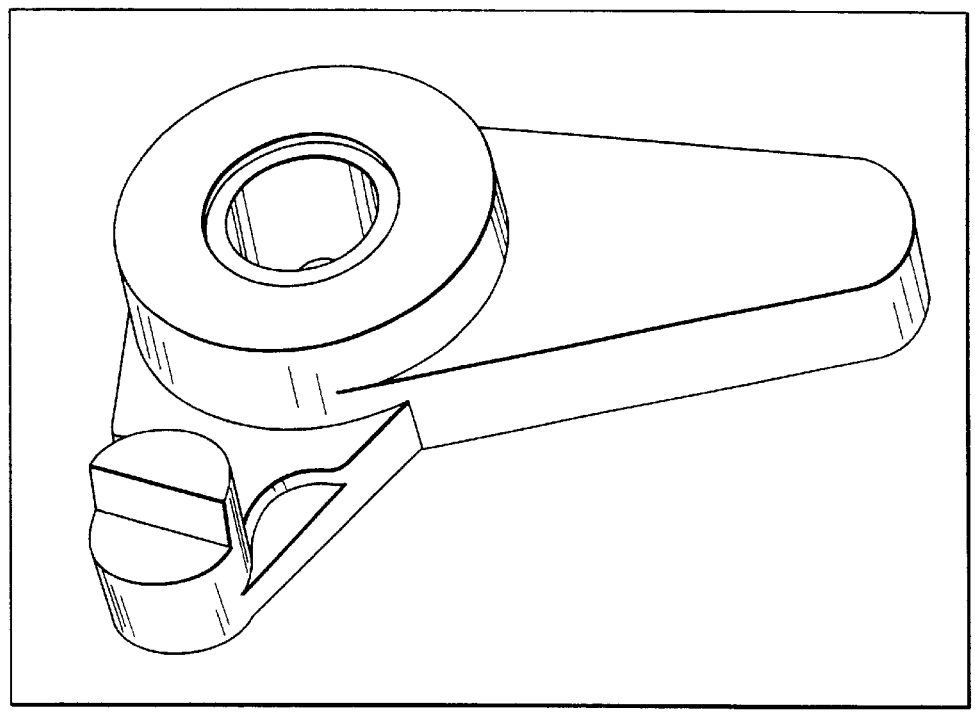
FIG. 9 is a view showing an example of the solid model of the shutter unit.

The translated bounded surface is traced parallel to obtain a solid. When all the bounded surfaces are changed to solids, all the solids are combined into one component solid. The result of the component solid is shown in FIG. 9.

Figure 10:
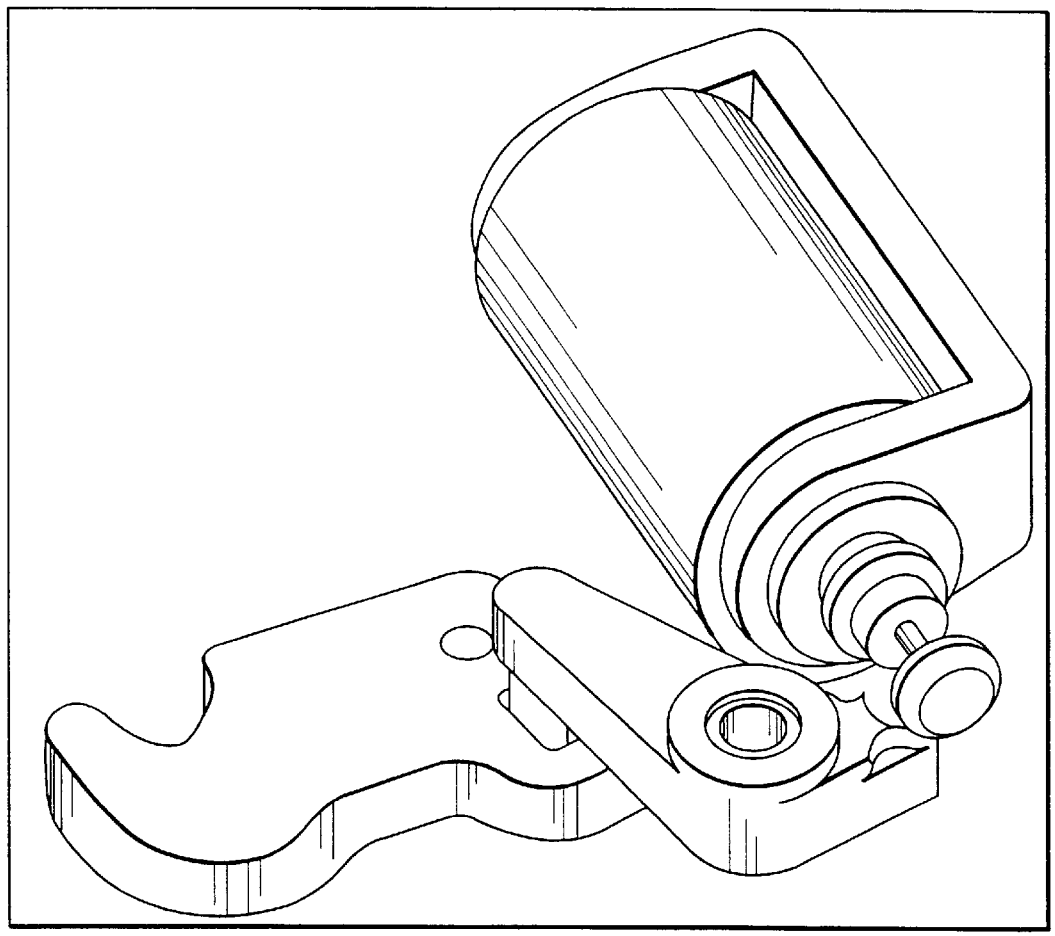
FIG. 10 is a view showing another example of the solid model of the shutter unit.

Similarly, the blade is also changed into a solid. The plunger is a commercially available component, and a library model may be used for this plunger. A solid model of the shutter unit is shown in FIG. 10.

The mechanism is operated using this solid model to examine a final design draft. If a failure such as interference occurs, the heights of the bounded surfaces are changed, the 2D shapes are changed, or the mechanism draft itself is changed to generate a design draft again.

According to this embodiment, use of the assembly structure in the mechanism component design support system allows sole management of all information of the camera mechanism components for injection molding. The designer can edit the assembly structure in designing mechanism components without experiencing any inconvenience. Use of the assembly structure allows sole management of data of components serving as targets in the process from design to production. Data exchange and time-consuming operation (manhour) can be reduced, and data loss occurring in data exchange can be prevented.

When the mechanism operation is confirmed, the design quality can be improved, and a failure such as interference can be confirmed in a stage prior to trial production. It is possible to improve design quality in transferring data to a post-process. Since a solid can be automatically generated, the designer can easily generate a 3D solid in a 2D design job to which the designer is accustomed. Therefore, many steps can be eliminated in generating a 3D solid. Therefore, the design period can be shortened.

Second Embodiment

This embodiment will exemplify an example of designing a case component which supports the shutter unit formed in the first embodiment. To support the shutter unit, holes (positioning and screw fastening holes) for fixing the plunger, a shaft defining the center of rotation of the lever, and a shaft defining the center of rotation of the blade are required. Since the blade is actually supported on the case through another separate component, the separate component will not be explained below.

The plunger is fixed by screwing on the side surface of the case. Holes must be defined by two-dimensionally projecting the side surface. The case is created in the same technique as in the first embodiment, and the side surface of the case is two-dimensionally projected to define plunger fixing holes. Holes are then defined on the projected surface.

Figure 14:
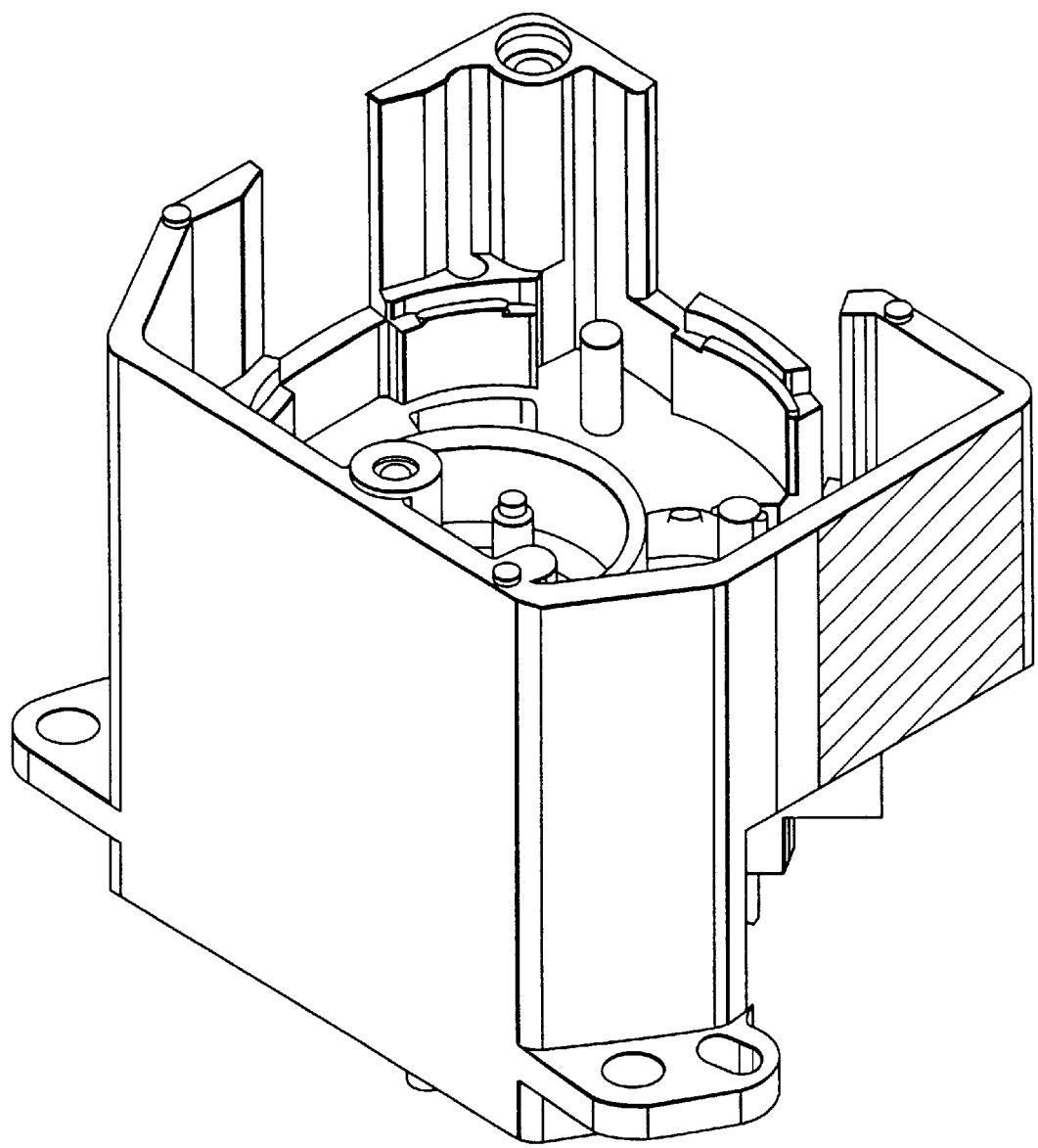
FIG. 14 is a view showing a case component before a plunger mounting hole is defined according to the second embodiment.
Figure 15:
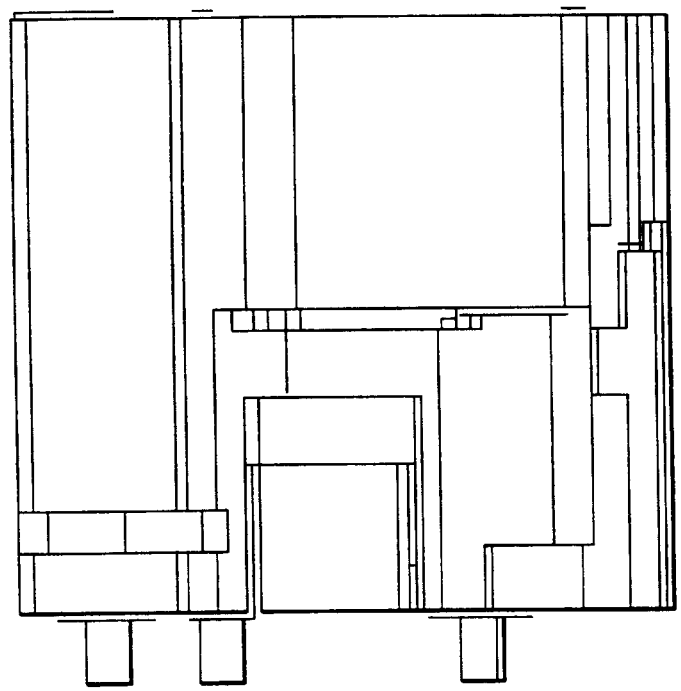
FIG. 15 is a view showing a state in which a hatched portion in FIG. 14 is projected on a 2D canvas.

FIG. 14 is a case component before the plunger fixing holes are defined. A surface (hatched portion in FIG. 14) in which holes are to be formed is projected on a 2D canvas, as shown in FIG. 15.

One of the plunger fixing holes is a screw fastening hole, and the other is a positioning hole in which the projecting portion of the plunger is fitted. The sizes of the holes and the distance between the holes are automatically determined depending on the type of plunger. To obtain the hole sizes and the distance between the holes, the design knowledge database outputs appropriate dimensions in accordance with the model number of the plunger.

When the center position of one hole is determined, the position of the other hole is instructed from the system to the designer using the dimensions thus obtained. The dimensional tolerances required for molding are also automatically determined in accordance with the plunger dimensions and their tolerances stored in the knowledge database.

Figure 16:
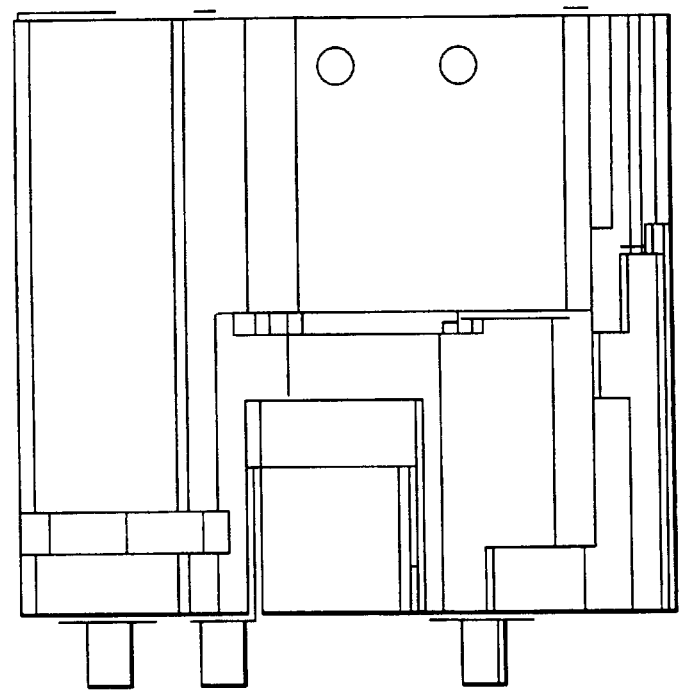
FIG. 16 is a view showing a state in which the 2D shape of the hole is defined.

2D shapes (circles in this case) each having an attribute as "hole" are created on the surface projected on the canvas. A state in which the 2D shapes of the holes are defined is shown in FIG. 16. When this model is considered as a mold for injection molding, the definitions from the side surface (definitions of the holes in this case) are those of the slide. In injection-molding a component the arrangement of a mold made up of the stationary side, movable side, and slide allows molding.

The most basic two-plate mold is made up of a stationary mold (material injection side) fixed to the fixing base of an injection molding machine and a movable mold fixed to the movable base of the molding machine. After a material is injected, the movable mold is moved to open the mold to remove a molded body. The molded body has a structure in which the vertical shape is defined. No lateral holes can be formed. To form lateral holes, the mold must be opened laterally. A mold which moves laterally is called a slide mold. As a result, the mold is made up of the stationary, movable, and slide molds.

Figure 17:
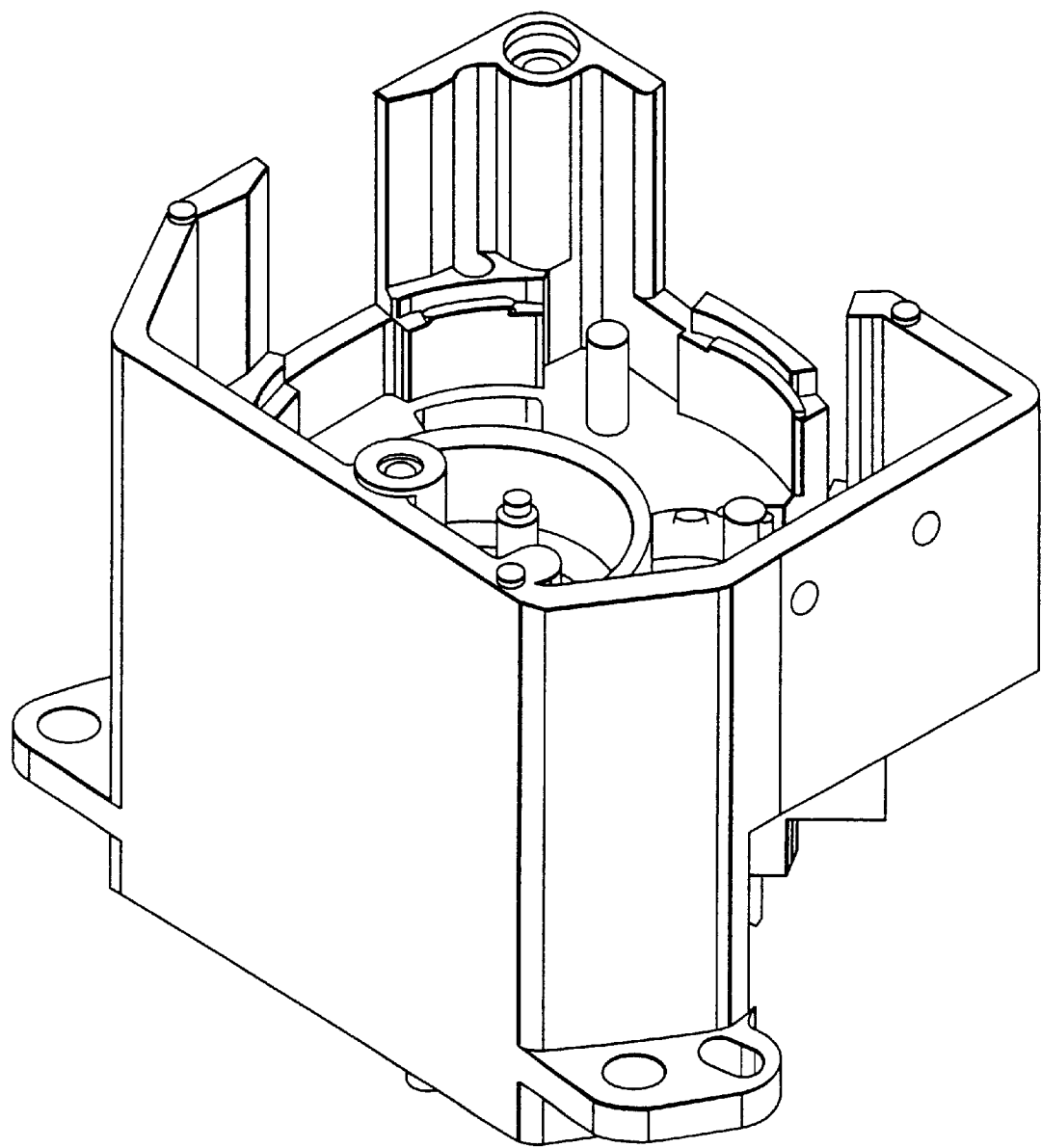
FIG. 17 is a view showing a state in which the defined hole is reflected on the original solid model.

A structure in which the finally defined holes are reflected on the original solid model is shown in FIG. 17. As shown in FIG. 17, the plunger fixing holes are formed.

A rotating shaft which supports the lever is defined. The lever must convert the force from the plunger into rotational motion and transmit it to the blade. For this purpose, upon receiving the force from the plunger, the lever must not cause deformation such as deflection on the shaft. A rib for reinforcing the shaft is formed to prevent deformation of the shaft.

Figure 18:
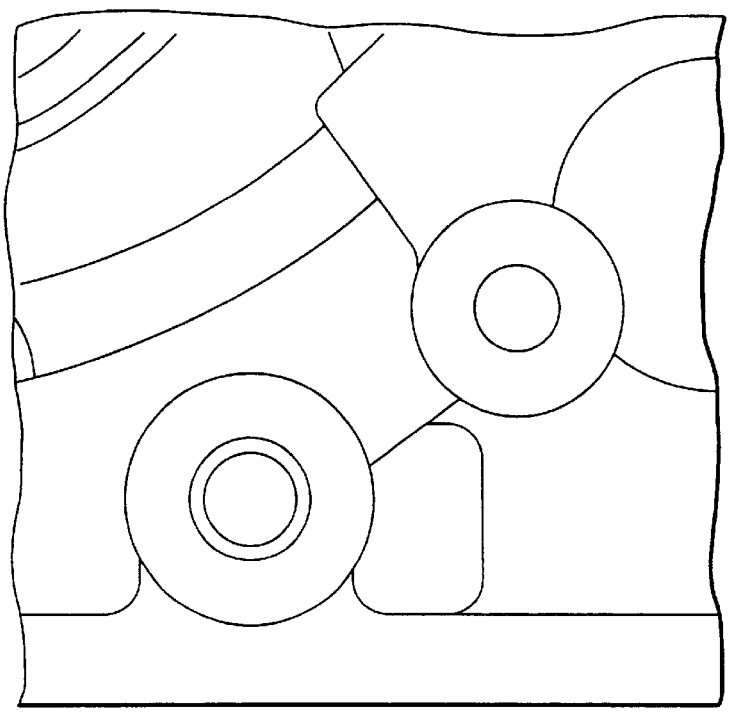
FIG. 18 is a view showing a state before a rib is disposed.
Figure 19:
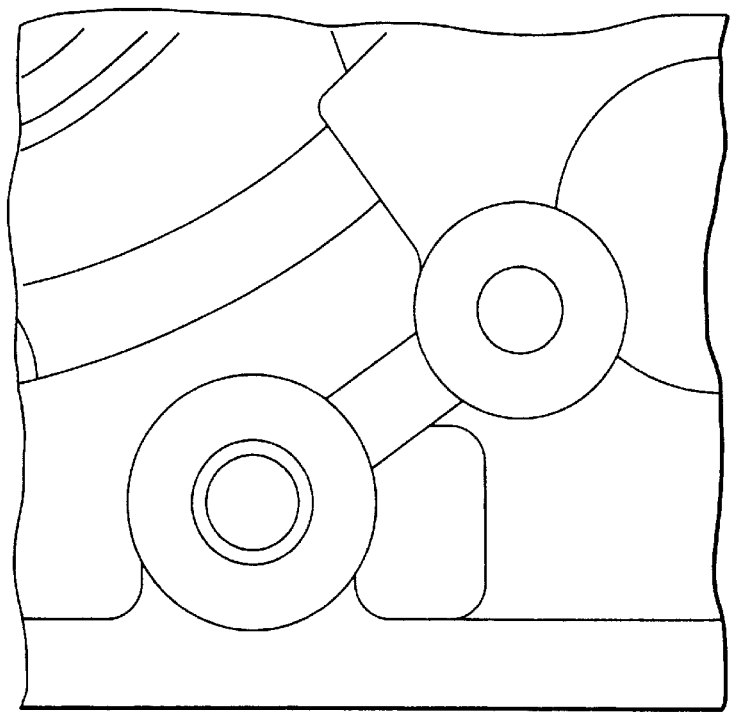
FIG. 19 is a view showing a state after the rib is disposed.

The size of the rib is determined in accordance with the specifications such as the material of the rib and the force from the plunger. A rib having a target size is disposed on the 2D space. FIG. 18 shows the structure before the rib is disposed, while FIG. 19 shows the structure after the rib is disposed.

As shown in FIG. 18, the rib simply disposed catches the shaft (the base portion of the shaft in this case). This is because the shape cannot be determined when a rib having a required size is simply disposed.

The detailed shape of the rib is then defined. The shape of the rib is defined by a nodal line with the side surface of the shaft. In this case, the nodal line is an arc. The nodal line is generated using a 3D shape calculation engine called a solid modeler in the general 3D CAD system. It is also possible to calculate a nodal line by using a commercially available solid modeler. However, a nodal line is calculated by polygonal approximation as a nodal line calculation not depending on the solid modeler.

According to this technique, all surfaces are replaced with small planes to facilitate the calculation. More specifically, the cylindrical surface as the side surface of the shaft is handled as a collection of very small rectangular planes. Since each plane can be defined by mathematical expressions representing four coordinate points or four sides the intersection (nodal line) between the planes can be easily calculated. In this case, a set of intersections between the upper surface of the rib and a plurality of rectangular planes (replacing the cylindrical surface) represents a nodal line. The nodal line is calculated in this manner, and the resultant structure on which the nodal line is reflected is shown in FIG. 20.

Figure 20:
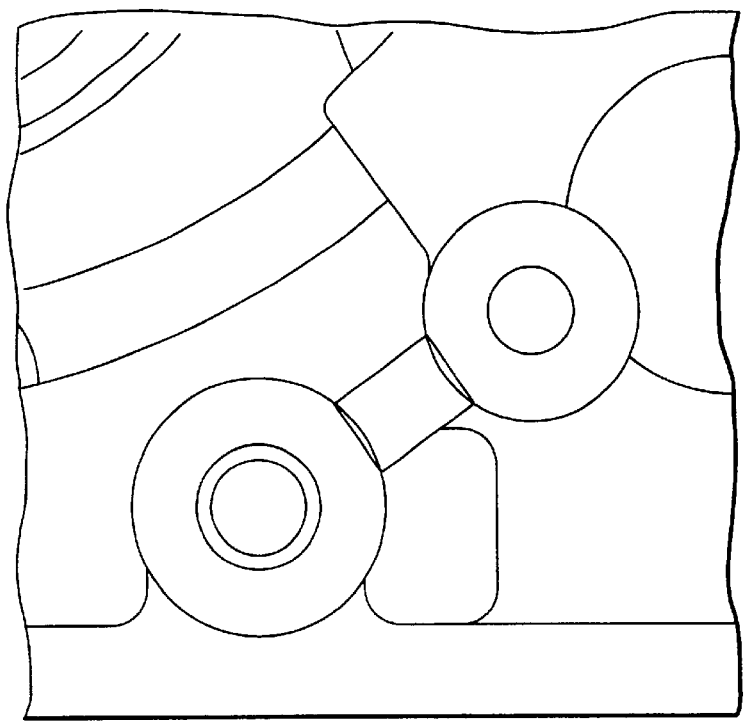
FIG. 20 is a view showing a state in which nodal lines are obtained and reflected.
Figure 21:
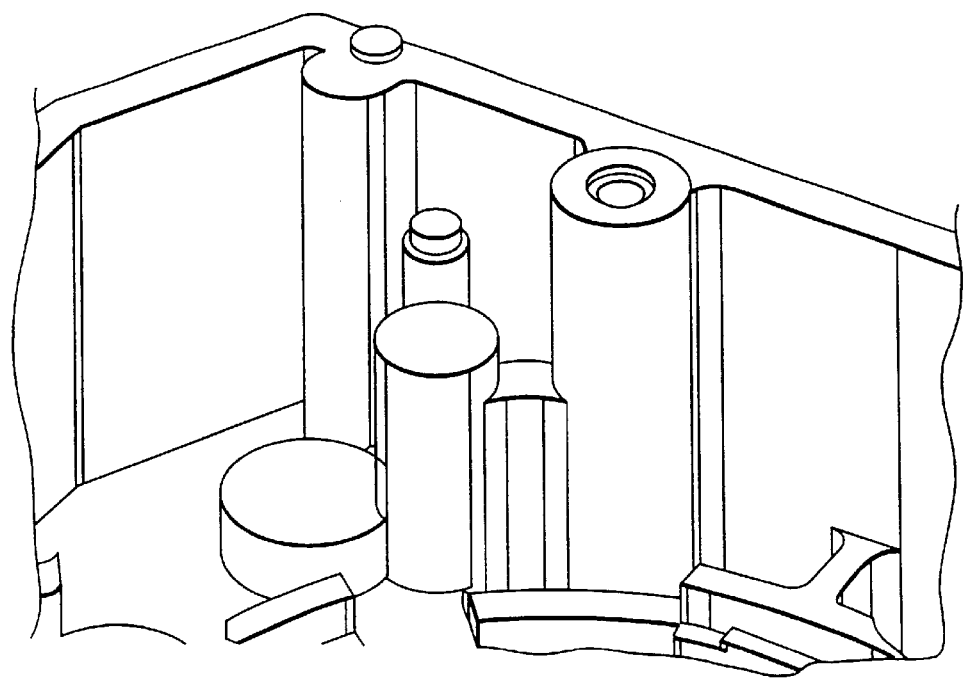
FIG. 21 is a view showing a solid state in which the rib defined in FIG. 20 is included.
Figure 22:
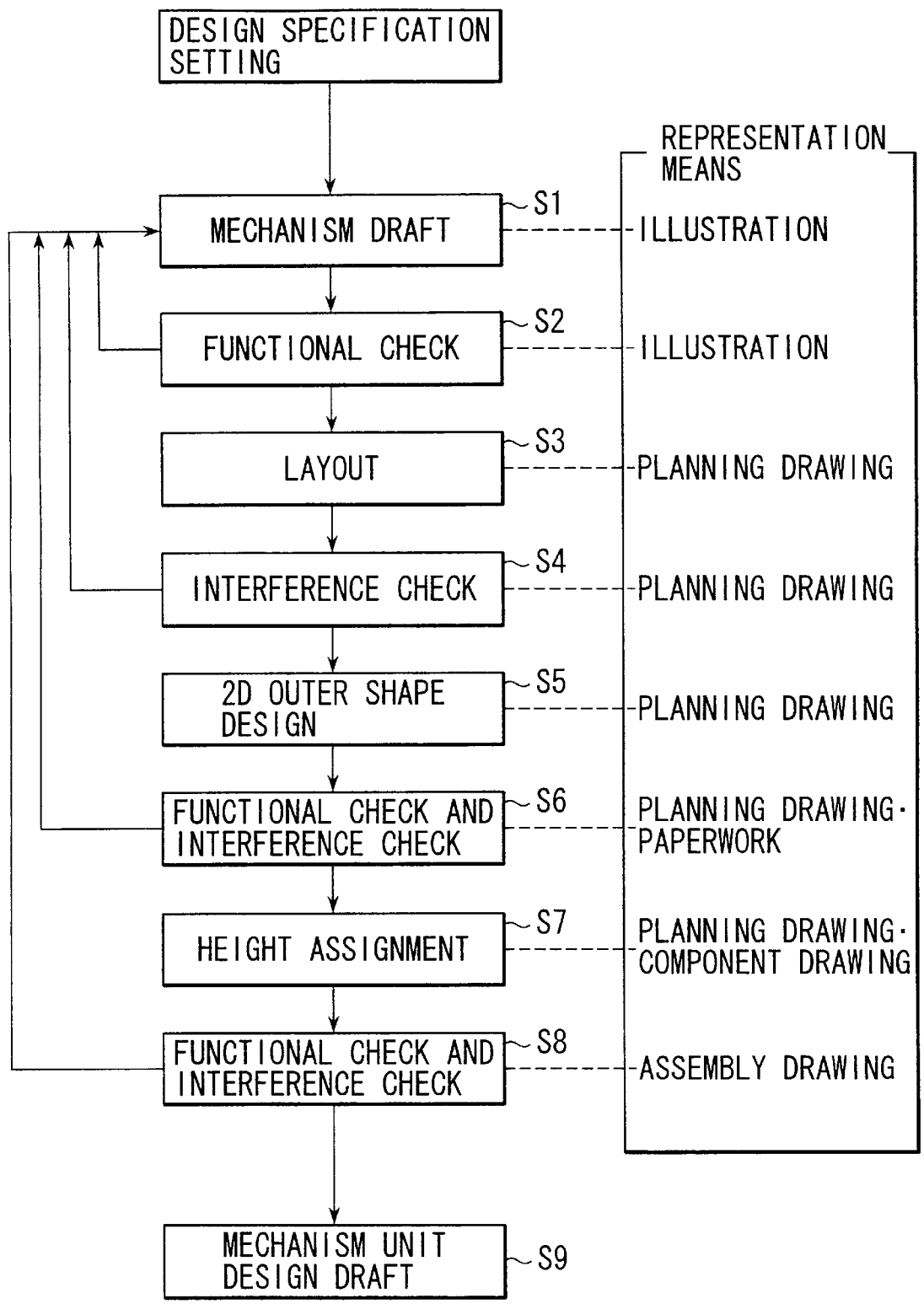
FIG. 22 is a view showing the design steps of a conventional mechanism unit.

A solid including the rib defined in FIG. 20 is shown in FIG. 21. The bonding portion between the rib and the shaft is filleted to increase the mechanical strength.

In this embodiment as well, the case component which supports the shutter unit can be designed within a short period of time by using the assembly structure in the mechanism component design support system. The same effect as in the first embodiment can also be obtained in the second embodiment.

The present invention is not limited the particular embodiments described above. Various changes and modifications can be made without departing from the spirit and scope of the invention. For example, the technique described in each embodiment can be written as a program executable by a computer in a storage medium such as a magnetic disk (e.g., a floppy disk or hard disk), optical disk (e.g., a CD-ROM or DVD), or semiconductor memory and can be applied to a variety of apparatuses. Alternatively, the technique may be transmitted via a communication medium and applicable to a variety of apparatuses. A computer for practicing the present invention loads a program stored in a storage medium, and the operation of the computer is controlled by the program, thereby executing the above processes.

As has been described above, according to the present invention, an assembly structure representing the hierarchical and layout relationships between assembly objects is used to solely manage the information of the mechanism components with the assembly structure. Systematic mechanism component design can be supported, which includes: generation of a mechanism draft using a skeleton model in selecting the mechanism draft and a mechanism operation simulation for the mechanism draft; a mechanism operation simulation in a state in which some (or all) 2D shape are determined; and then automatic generation of a 3D shape and a mechanism operation simulation for the 3D shape. Therefore, the present invention is very effective in CAD design for a variety of mechanism components.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A design support system comprising:
   a mechanism object library for storing knowledge for defining, based on assembly structure information, a plurality of mechanism components usable in a skeleton model;
   an examination unit for inputting a mechanism draft for achieving a specified object, using the skeleton model, and examining a function of the skeleton model;
   a two dimensional shape editor for editing, based on required specifications of the mechanism draft, a two dimensional shape of a mechanism component selected from said mechanism object library;
   a model database for redefining, using the assembly structure, an attribute which is output from said two dimensional shape editor and defines the mechanism component, and storing the redefined attribute; and
   solid model generating means for generating a three-dimensional solid model corresponding to the mechanism component based on the assembly structure information;
   wherein the attribute of the mechanism component is managed based on the assembly structure information.

2. The system according to claim 1, wherein said skeleton model comprises a scheme which expresses a set of points and lines.

3. The system according to claim 1, wherein said assembly structure information comprises at least one of a component and assembly, and includes information for defining a relationship between assembly objects, and wherein each of the assembly objects has attributes of material, size, and shape.

4. The system according to claim 1, wherein said two dimensional shape editor defines a two dimensional shape of the mechanism component in an opening direction view in consideration of parting properties of a mold.

5. The system according to claim 1, further comprising nodal line calculation means for calculating a nodal line between two-dimensional bounded surfaces output from said two dimensional shape editor, wherein said model database redefines, using the assembly structure,
   wherein said attribute includes an attribute relevant to the nodal line and redefined in said model database.

6. The system according to claim 1, further comprising:
   a design knowledge database which stores a design knowledge of the mechanism component, and is used for searching for a design draft.

7. A design support system comprising:
   a mechanism object library for storing knowledge for defining, based on assembly structure information, a plurality of mechanism components usable in a skeleton model;
   an examination unit for inputting a mechanism draft for achieving a specified object, using the skeleton model, and examining a function of the skeleton model;
   a two dimensional shape editor for editing, based on required specifications of the mechanism draft, a two dimensional shape of a mechanism component selected from said mechanism object library;
   a model database for redefining, using the assembly structure, an attribute which is output from said two dimensional shape editor and defines the mechanism component, and storing the redefined attribute;

nodal line calculation means for calculating a nodal line between two-dimensional bounded surfaces output from said two dimensional shape editor;

solid model generation means for generating a three-dimensional solid model corresponding to said mechanism component, based on the assembly structure information; and projected drawing generation means for generating a two-dimensional projected drawing corresponding to the three-dimensional solid model generated by said solid model generation means;

wherein the attribute of the mechanism component is managed based on the assembly structure information.

8. The system according to claim 7, further comprising projected drawing display means for displaying said two-dimensional projected drawing generated by said projected drawing generation means, wherein the projected drawing is fed back to said two dimensional shape editor.

9. The system according to claim 7, wherein said two dimensional shape editor defines the two dimensional shape of the mechanism component in an opening direction view in consideration of parting properties of a mold.

10. A design support system comprising:

input means for inputting a scheme as an initial data for designing a mechanism draft which comprises a plurality of mechanical components;

a knowledge database including various kinds of design information corresponding to a mechanical component design;

an editor for editing each of the mechanical components to satisfy a required specification, by referring to the knowledge database;

unifier means for unifying at least one of attributes which define the mechanical component edited by the editor to a predetermined data system;

means for storing the mechanical component having the attribute unified to said data system by the unifier means in a model database form, and outputting the model database to an external device; and solid model generating means for generating a three-dimensional solid model corresponding to the mechanical component based on assembly structure information.

11. A computer readable storage medium which stores a mechanism component design support program for controlling a computer to support design of a mechanism component, said program controlling said computer to function as:

a mechanism object library for storing knowledge for defining, based on assembly structure information, a plurality of mechanism components usable in a skeleton model;

an examination unit for inputting a mechanism draft for achieving a specified object, using the skeleton model, and examining a function of the skeleton model;

a two dimensional shape editor for editing, based on required specifications of the mechanism draft, a two dimensional shape of a mechanism component selected from said mechanism object library;

a model database for redefining, using the assembly structure, an attribute which is output from said two dimensional shape editor and defines the mechanism component, and storing the redefined attribute; and solid model generating means for generating a three-dimensional solid model corresponding to the mechanism component based on the assembly structure information;

wherein said program controls said computer to manage the attribute of the mechanism component based on the assembly structure information.

12. A design support system in which an attribute of a mechanism component is defined based on assembly structure information, the system comprising:

examination means for inputting a skeleton model corresponding to a mechanism, and examining whether a desired behavior is obtainable from the mechanism based on a behavior of the skeleton model;

a mechanism object library for storing various kinds of design knowledge defined in a form of the assembly structure information, the design knowledge being provided for each of mechanical components which are applicable to the skeleton model;

a design knowledge database including a design knowledge of the mechanical components;

search means for searching, based on the mechanism object library and the design knowledge database, for a design draft for each of the mechanical components examined by the examination means;

a two dimensional shape editor for editing a two dimensional shape obtained as a result of the search, in accordance with a desired specification of the mechanical draft;

a model database for redefining an attribute applied to the mechanical component in the form of the assembly structure information and storing the redefined attribute, the mechanical component being output from said two dimensional shape editor; and solid model generating means for generating a three-dimensional solid model corresponding to the mechanical component based on the assembly structure information.

13. The system according to claim 12, further comprising:

nodal line calculation means for calculating a nodal line between the two-dimensional bounded surfaces output from said two dimensional shape editor;

projected drawing generation means for generating a two-dimensional projected drawing corresponding to the three-dimensional solid model generated by said solid model generation means; and projected drawing display means for displaying said two-dimensional projected drawing generated by said projected drawing generation means, the projected drawing being fed back to said two dimensional shape editor;

wherein the two dimensional shape editor defines the two dimensional shape of the mechanism component in an opening direction view in consideration of parting properties of a mold.

14. A design support method, comprising:

storing knowledge for defining, based on assembly structure information, a plurality of mechanism components usable in a skeleton model, in a mechanism object library;

inputting a mechanism draft for achieving a specified object, using the skeleton model, and examining a function of the skeleton model;

editing a two dimensional shape of a mechanism component selected from the mechanism object library by use of a two dimensional shape editor, the two dimensional shape being based on required specifications of the mechanism draft;

redefining, using the assembly structure information, an attribute which is output from the two dimensional shape editor and defines the mechanism component, and storing the redefined attribute in a model database, generating a three-dimensional solid model corresponding to the mechanism component based on the assembly structure information; and wherein the attribute of the mechanism component is consistently managed based on the assembly structure information.

15. A design support method, comprising:

storing knowledge for defining, based on assembly structure information, a plurality of mechanism components usable in a skeleton model, in a mechanism object library;

inputting a mechanism draft for achieving a specified object, using the skeleton model, and examining a function of the skeleton model;

editing a two dimensional shape of a mechanism component selected from the mechanism object library by use of a two dimensional shape editor, the two dimensional shape being based on required specifications of the mechanism draft;

redefining, using the assembly structure, an attribute which is output from the two dimensional shape editor and defines the mechanism component, and storing the redefined attribute in a model database;

calculating a nodal line between two-dimensional bounded surfaces output from the two dimensional shape editor;

generating a three-dimensional solid model corresponding to the mechanism component, based on the assembly structure information; and generating a two-dimensional projected drawing corresponding to the three-dimensional solid model;

wherein the attribute of the mechanism component is consistently managed based on the assembly structure information.

16. A computer readable storage medium storing a program for implementing a computer aided mechanism design by utilizing assembly structure information, the program instructing the computer to:

store knowledge for defining, based on assembly structure information, a plurality of mechanism components usable in a skeleton model, in a mechanism object library;

input a mechanism draft for achieving a specified object, using the skeleton model, and to examine a function of the skeleton model;

edit a two dimensional shape of a mechanism component selected from the mechanism object library by use of a two dimensional shape editor, the two dimensional shape being based on required specifications of the mechanism draft;

redefine, using the assembly structure, an attribute which is output from the two dimensional shape editor and defines the mechanism component, and to store the redefined attribute in a model database;

calculate a nodal line between two-dimensional bounded surfaces output from the two dimensional shape editor;

generate a three-dimensional solid model corresponding to the mechanism component, based on the assembly structure information; and generate a two-dimensional projected drawing corresponding to the three-dimensional solid model;

wherein the attribute of the mechanism component is consistently managed based on the assembly structure information.

17. A design support method, comprising:

inputting a scheme as an initial data for designing a mechanism draft which comprises a plurality of mechanical components;

storing various kinds of design information corresponding to a mechanical component design in a knowledge database;

editing, by use of an editor, each of the mechanical components to satisfy a required specification, while referring to the knowledge database;

unifying at least one of attributes which define the mechanical component edited by the editor to a predetermined data system;

storing the mechanical component having the attribute unified to the data system in a model database form, and outputting the model database to an external device; and generating a three-dimensional solid model corresponding to the mechanical component based on the assembly structure information.

18. A computer readable storage medium storing a program for implementing a computer aided mechanism design by utilizing assembly structure information, the program comprising:

means for instructing the computer to input a scheme as an initial data for designing a mechanism draft which comprises a plurality of mechanical components;

means for instructing the computer to store various kinds of design information corresponding to a mechanical component design in a knowledge database;

means for instructing the computer to edit, by use of an editor, each of the mechanical components to satisfy a required specification, while referring to the knowledge database;

means for instructing the computer to unify at least one of attributes which define the mechanical component edited by the editor to a predetermined data system;

means for instructing the computer to store the mechanical component having the attribute unified to the data system in a model database form, and to output the model database to an external device;

means for instructing the computer to generate a three-dimensional solid model corresponding to the mechanical component based on the assembly structure information.

19. A method for supporting design in a design support system in which an attribute of a mechanism component is defined based on assembly structure information, the method comprising:

inputting a skeleton model corresponding to a mechanism, and examining whether a desired behavior is obtainable from the mechanism based on a behavior of the skeleton model;

storing various kinds of design knowledge defined in a form of the assembly structure information, in a mechanism object library, the design knowledge being provided for each of mechanical components which are applicable to the skeleton model;

storing a design knowledge of the mechanical components, in a design knowledge database;

searching, based on the mechanism object library and the design knowledge database, for a design draft for each of the mechanical components;

editing, by use of a two dimensional shape editor, a two dimensional shape obtained as a result of the search, in accordance with a desired specification of the mechanical draft;

redefining an attribute applied to the mechanical component in the form of the assembly structure information and storing the redefined attribute in a model database, the mechanical component being output from the two dimensional shape editor; and generating a three-dimensional solid model corresponding to the mechanical component based on the assembly structure information.

20. A computer readable storage medium storing a program for implementing a computer aided mechanism design in which an attribute of a mechanism component is defined based on assembly structure information, the program comprising:

means for instructing a computer to input a skeleton model corresponding to a mechanism, and examine whether a desired behavior is obtainable from the mechanism based on a behavior of the skeleton model;

means for instructing the computer to store various kinds of design knowledge defined in a form of the assembly structure information, in a mechanism object library, the design knowledge being provided for each of mechanical components which are applicable to the skeleton model;

means for instructing the computer to store a design knowledge of the mechanical components, in a design knowledge database;

means for instructing the computer to search, based on the mechanism object library and the design knowledge database, for a design draft for each of the mechanical components;

means for instructing the computer to edit, by use of a two dimensional shape editor, a two dimensional shape obtained as a result of the search, in accordance with a desired specification of the mechanical draft;

means for instructing the computer to redefine an attribute applied to the mechanical component in the form of the assembly structure information and to store the redefined attribute in a model database, the mechanical component being output from the two dimensional shape editor; and means for instructing the computer to generate a three-dimensional solid model corresponding to the mechanical component based on the assembly structure information.

21. A design support system comprising:

a mechanism object library for storing knowledge for defining, based on assembly structure information, a plurality of mechanism components usable in a skeleton model;

an examination unit for inputting a mechanism draft for achieving a specified object, using the skeleton model, and examining a function of the skeleton model;

a two dimensional shape editor for editing, based on required specifications of the mechanism draft, a two dimensional shape of a mechanism component selected from the mechanism object library, wherein the two dimensional shape editor provides a functionality for checking interference between the two dimensional shape and two dimensional shapes of other components;

a model database for redefining, in a form of the assembly structure information, an attribute which is output from the two dimensional shape editor and defines the mechanism component, and storing the redefined attribute;

solid model generation means for generating a three-dimensional solid model corresponding to the mechanism component by parallel tracing of the two dimensional shape, the solid model being based on the assembly structure information; and projected drawing generation means for generating a two-dimensional projected drawing corresponding to the three-dimensional solid model generated by the solid model generation means;

wherein the attribute of the mechanism component is consistently managed based on the assembly structure information.

22. The system according to claim 21, further comprising projected drawing display means for displaying the two-dimensional projected drawing generated by the projected drawing generation means, wherein the projected drawing is fed back to the two dimensional shape editor.

23. The system according to claim 21, wherein the two dimensional shape editor defines the two dimensional shape of the mechanism component in an opening direction view in consideration of parting properties of a mold.

24. A design support system in which an attribute of a mechanism component is defined based on assembly structure information, the system comprising:

examination means for inputting a skeleton model corresponding to a mechanism, and examining whether a desired behavior is obtainable from the mechanism based on a behavior of the skeleton model;

a mechanism object library for storing various kinds of design knowledge defined in a form of the assembly structure information, the design knowledge being provided for each of mechanical components which are applicable to the skeleton model;

a design knowledge database including a design knowledge of the mechanical components;

search means for searching, based on the mechanism object library and the design knowledge database, for a design draft for each of the mechanical components examined by the examination means;

a two dimensional shape editor for editing a two dimensional shape obtained as a result of the search, in accordance with a desired specification of the mechanical draft, wherein the two dimensional shape editor includes a function for checking interference between the two dimensional shape and two dimensional shapes of other components;

a model database for redefining an attribute applied to the mechanical component in the form of the assembly structure information and storing the redefined attribute, the mechanical component being output from the two dimensional shape editor;

solid model generation means for generating a three-dimensional solid model corresponding to the mechanical component by parallel tracing of the two dimensional shape, the solid model being based on the assembly structure information;

projected drawing generation means for generating a two-dimensional projected drawing corresponding to the three-dimensional solid model generated by the solid model generation means; and projected drawing display means for displaying the two-dimensional projected drawing generated by the projected drawing generation means, the projected drawing being fed back to the two dimensional shape editor, and wherein the two dimensional shape editor defines the two dimensional shape of the mechanical component in an opening direction view in consideration of parting properties of a mold.

25. A system of computer aided mechanism design by utilizing assembly structure information, comprising:

means for selecting a skeleton model for a mechanism based on a unit specification by retrieving design information including assembly structure from a database to define a set of components;

means for associating components with one another in the skeleton model;

means for editing a two-dimensional outer shape of a component by using a two-dimensional shape editor for editing functional edge of the component, the two-dimensional shape editor editing closed polygons on the component and generating a part of the assembly structure information; and means for generating three-dimensional solid models for each of the two-dimensional components by assigning height attributes in an opening direction in consideration of a parting property of a mold, the property being included in the assembly structure information.

26. A method of computer aided mechanism design by utilizing assembly structure information, comprising:

selecting a skeleton model for a mechanism based on a unit specification by retrieving design information including assembly structure from a database to define a set of components;

associating components with one another in the selected skeleton model;

editing a two-dimensional outer shape of a component by using a two-dimensional shape editor for editing functional edge of the component, the two-dimensional shape editor editing closed polygons on the component and generating a part of the assembly structure information; and generating three-dimensional solid models for each of the two-dimensional components by assigning height attributes in an opening direction in consideration of a parting property of a mold, the property being included in the assembly structure information.

27. A computer readable storage medium storing a program for implementing a computer aided mechanism design by utilizing assembly structure information, the program instructing the computer to:

select a skeleton model for a mechanism based on a unit specification by retrieving design information including assembly structure from a database to define a set of components;

associate components with one another in the selected skeleton model;

edit a two-dimensional outer shape of a component by using a two-dimensional shape editor for editing functional edge of the component, the two-dimensional shape editor editing closed polygons on the component and generating a part of the assembly structure information; and generate three-dimensional solid models for each of the two-dimensional components by assigning height attributes in an opening direction in consideration of a parting property of a mold, the property being included in the assembly structure information.

* * * * *

UNITED STATES PATENT AND TRADEMARK OFFICE
CERTIFICATE OF CORRECTION

PATENT NO. : 6,768,928 B1
DATED : July 27, 2004
INVENTOR(S) : Isao Nagasawa

It is certified that error appears in the above-identified patent and that said Letters Patent is hereby corrected as shown below:

<u>Title page,</u>
Item [73], Assignee, add -- Isao Nagasawa, Munakata-shi, Fukuoka-ken (JP), Masanobu Umeda, Munakataq-shi, Fukuoka-ken (JP) --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,768,928 B1 Page 1 of 1
APPLICATION NO. : 09/573296
DATED : July 27, 2004
INVENTOR(S) : Isao Nagasawa It is certified that error appears in the above-identified patent and that said Letters Patent is hereby corrected as shown below:

Title page,
Item [73], Assignee, add -- Isao Nagasawa, Munakata-shi, Fukuoka-ken (JP), Masanobu Umeda, Munakata-shi, Fukuoka-ken (JP) --.

This certificate supersedes Certificate of Correction issued February 7, 2006.

Signed and Sealed this

Twenty-eighth Day of November, 2006

JON W. DUDAS
*Director of the United States Patent and Trademark Office*